US012063355B2

(12) United States Patent
Gao et al.

(10) Patent No.: US 12,063,355 B2
(45) Date of Patent: Aug. 13, 2024

(54) SUBBLOCK BASED MOTION VECTOR PREDICTOR DISPLACEMENT VECTOR REORDERING USING TEMPLATE MATCHING

(71) Applicant: Tencent America LLC, Palo Alto, CA (US)

(72) Inventors: Han Gao, San Diego, CA (US); Lien-Fei Chen, Hsinchu (TW); Guichun Li, San Jose, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 91 days.

(21) Appl. No.: 17/985,127

(22) Filed: Nov. 10, 2022

(65) Prior Publication Data

US 2023/0388485 A1 Nov. 30, 2023

Related U.S. Application Data

(60) Provisional application No. 63/346,283, filed on May 26, 2022.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/159* (2014.11);
(Continued)

(58) Field of Classification Search
CPC .. H04N 19/105; H04N 19/139; H04N 19/159; H04N 19/176; H04N 19/513; H04N 19/70
(Continued)

(56) References Cited

U.S. PATENT DOCUMENTS 11,838,539 B2 * 12/2023 Liu .................. H04N 19/186
2019/0387251 A1 * 12/2019 Lin .................. H04N 19/105
(Continued)

OTHER PUBLICATIONS

High Efficiency Video Coding, Rec. ITU-T H.265 v4 Dec. 2016, pp. 1-664.
(Continued)

*Primary Examiner* — Dominic D Saltarelli
(74) *Attorney, Agent, or Firm* — ArentFox Schiff LLP

(57) ABSTRACT

Aspects of the disclosure provide a method and an apparatus for video encoding/decoding. The apparatus includes processing circuitry for: receiving prediction information of a current coding block in a current picture from a coded video bitstream, the prediction information indicating that the current coding block is coded using a subblock-based temporal motion vector prediction (SbTMVP) mode; deriving multiple displacement vector (DV) candidates by applying multiple DV offset candidates to a fixed DV predictor of the current coding block; comparing a template of the current coding block with each of multiple templates, each template of the multiple templates being located at a position specified by a corresponding one of the multiple DV candidates; calculating a cost value associated with each one of the multiple DV offset candidates based on the comparing; and reordering DV offset indices of the multiple DV offset candidates based on their calculated cost values.

20 Claims, 22 Drawing Sheets

(51) Int. Cl.
  *H04N 19/159* (2014.01)
  *H04N 19/176* (2014.01)
  *H04N 19/513* (2014.01)
  *H04N 19/70* (2014.01)

(52) U.S. Cl.
  CPC ......... *H04N 19/176* (2014.11); *H04N 19/513* (2014.11); *H04N 19/70* (2014.11)

(58) Field of Classification Search
  USPC .................................................... 375/240.16
  See application file for complete search history.

(56) References Cited

U.S. PATENT DOCUMENTS

| | | | |
|---|---|---|---|
| 2022/0264147 A1* | 8/2022 | Robert | H04N 19/513 |
| 2023/0104476 A1* | 4/2023 | Chen | H04N 19/88 |
| | | | 375/240.02 |
| 2023/0109532 A1* | 4/2023 | Chen | H04N 19/88 |
| | | | 375/240.02 |
| 2023/0336737 A1* | 10/2023 | Chen | H04N 19/137 |
| 2023/0388513 A1* | 11/2023 | Chen | H04N 19/105 |
| 2024/0007615 A1* | 1/2024 | Liao | H04N 19/105 |
| 2024/0015333 A1* | 1/2024 | Chen | H04N 19/70 |

OTHER PUBLICATIONS

ITU-T and ISO/IEC, "Versatile Video Coding", ITU-T Rec. H.266 and ISO/IEC 23090-3, 2020, pp. 1-516.

H. Yang, H. Chen, J. Chen, S. Esenlik, S. Sethuraman, X. Xiu, E. Alshina, and J. Luo, "Subblock-Based Motion Derivation and Inter Prediction Refinement in Versatile Video Coding Standard", IEEE Trans. Circuits Syst. Video Technol., vol. 31, No. 10, pp. 3862-3877, Oct. 2021.

M. Coban, et al., "Algorithm description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

* cited by examiner

SUBBLOCK BASED MOTION VECTOR PREDICTOR DISPLACEMENT VECTOR REORDERING USING TEMPLATE MATCHING

INCORPORATION BY REFERENCE

The present application claims the benefit of priority to U.S. Provisional Application No. 63/346,283, entitled "SUBBLOCK BASED MOTION VECTOR PREDICTOR DISPLACEMENT VECTOR REORDERING USING TEMPLATE MATCHING" and filed on May 26, 2022, which is incorporated by reference herein in its entirety.

TECHNICAL FIELD

The present application describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus includes processing circuitry. The processing circuitry is configured to receive prediction information of a current coding block in a current picture from a coded video bitstream, the prediction information indicating that the current coding block is coded using a subblock-based temporal motion vector prediction (SbTMVP) mode. The processing circuitry is further configured to obtain multiple DV offsets from the coded video stream, each DV offset corresponding to a displacement vector candidate, and derive multiple displacement vector (DV) candidates by applying multiple DV offset candidates to a fixed DV predictor of the current coding block. The processing circuitry is further configured to compare a template of the current coding block with each of multiple templates, each template of the multiple templates being located at a position specified by a corresponding one of the multiple DV candidates. The processing circuitry is further configured to calculate a cost value associated with each one of the multiple DV offset candidates based on the comparing. The processing circuitry is further configured to reorder DV offset indices of the multiple DV offset candidates based on their calculated cost values, and predict the current coding block in the SbTMVP mode based at least on a DV offset index selected from the reordered DV offset indices In some aspects, the processing circuitry is further configured to receive an index signaled in the coded video bitstream, wherein the index indicates which DV offset candidate is selected among the reordered DV offset indices for performing SbTMVP.

In some aspects, after the reordering, the processing circuitry is further configured to select a DV offset candidate with a lowest calculated template matching cost by default for performing SbTMVP.

In some aspects, the cost value is calculated by performing Sum of Absolute Differences (SAD), Sum of Absolute Transformed Differences (SATD), Sum of Squared Error (SSE), sub-sampled SAD, or mean-removed SAD.

In some aspects, the multiple DV candidates comprise Merge with Motion Vector Difference (MMVD) candidates.

In some aspects, the comparing, the calculating, and the reordering are performed only for a subset of the MMVD candidates, wherein a relative order of one or more other ones of the MMVD candidates is kept unchanged.

In some aspects, the comparing, the calculating, and the reordering are performed for all of the MMVD candidates, wherein after reordering only a number N of the MMVD candidates which have a lowest cost are used, wherein the number N is less than or equal to a total number of the MMVD candidates.

In some aspects, an index in a range of [0, N−1] is signaled into a bitstream to indicate which MMVD candidate is used, wherein the number N is predefined or is signaled into a high-level syntax.

In some aspects, the DV offset indices are reordered by descending or ascending order of their calculated cost values.

Some further aspects of the disclosure provide methods and apparatuses for video encoding and decoding. In some examples, an apparatus includes processing circuitry. The processing circuitry is configured to receive prediction information of a current coding block in a current picture from a coded video bitstream, the prediction information indicating that the current coding block is coded using a subblock-based temporal motion vector prediction (SbTMVP) mode. The processing circuitry is further configured to compare a template of the current coding block with each of multiple templates, each template of the multiple templates being located at a position specified by a corresponding one of multiple displacement vector (DV) predictor candidates. The processing circuitry is further configured to calculate a cost value associated with each one of the multiple DV predictor candidates based on the comparing. The processing circuitry is further configured to reorder a list of the multiple DV predictor candidates based on their calculated cost values and predict/reconstruct the current coding block in the SbTMVP mode based on a DV predictor selected from the reordered list of DV predictor candidates.

In some aspects, the processing circuitry is further configured to receive an index signaled in the coded video bitstream, wherein the index indicates which DV predictor candidate is selected from the reordered list of the multiple DV predictor candidates for performing SbTMVP.

In some aspects, after the reordering, the processing circuitry is further configured to select a DV predictor candidate with a lowest calculated template matching cost by default for performing SbTMVP.

In some aspects, the list of the multiple DV predictor candidates is constructed from spatial neighboring coding units (CUs) or from history-based motion vector prediction (HMVP) candidates.

In some aspects, after the reordering, only a first N number of the multiple DV predictor candidates on the list are signaled.

In some aspects, the multiple DV predictor candidates in the list are reordered by descending or ascending order of their calculated cost values.

Some further aspects of the disclosure provide methods and apparatuses for video encoding and decoding. In some examples, an apparatus includes processing circuitry. The processing circuitry is configured to receive prediction information of a current coding block in a current picture from a coded video bitstream, the prediction information indicating that the current coding block is coded using a subblock-based temporal motion vector prediction (SbTMVP) mode. The processing circuitry is further configured to generate a SbTMVP candidate list including multiple displacement vector (DV) candidates for the current coding block, wherein the SbTMVP candidate list includes at least one DV predictor candidate derived without applying any DV offset and at least one other DV predictor candidate derived by applying a DV offset to a base DV predictor. The processing circuitry is further configured to compare a template of the current coding block with each of multiple templates, each template of the multiple templates being located at a position specified by a corresponding one of the multiple DV candidates in the SbTMVP candidate list. The processing circuitry is further configured to calculate a cost value associated with each one of the multiple DV candidates based on the comparing. The processing circuitry is further configured to reorder the multiple DV candidates on the SbTMVP candidate list based on their calculated cost values.

In some aspects, the processing circuitry is further configured to receive an index signaled in the coded video bitstream, wherein the index indicates which DV candidate is selected from the reordered SbTMVP candidate list for performing SbTMVP.

In some aspects, the selected DV candidate is a SbTMVP DV candidate derived without applying any DV offset or is a SbTMVP Merge with Motion Vector Difference (MMVD) candidate derived by applying a respective DV offset to a respective base DV predictor.

In some aspects, when the selected DV candidate is the SbTMVP MMVD candidate, a signaling of the respective base DV predictor and a signaling of an index of the respective DV offset are performed separately.

In some aspects, the SbTMVP candidate list is constructed independently of an affine merge candidate list when template matching based reordering of candidates is enabled for a current frame, wherein when a subblock merge mode is signaled, an additional syntax is signaled at coding block level to indicate whether to construct the SbTMVP candidate list or the affine merge candidate list.

Aspects of the disclosure also provide a non-transitory computer-readable storage medium storing a program executable by at least one processor to perform any one of the above methods.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF ASPECTS

Figure 1A:
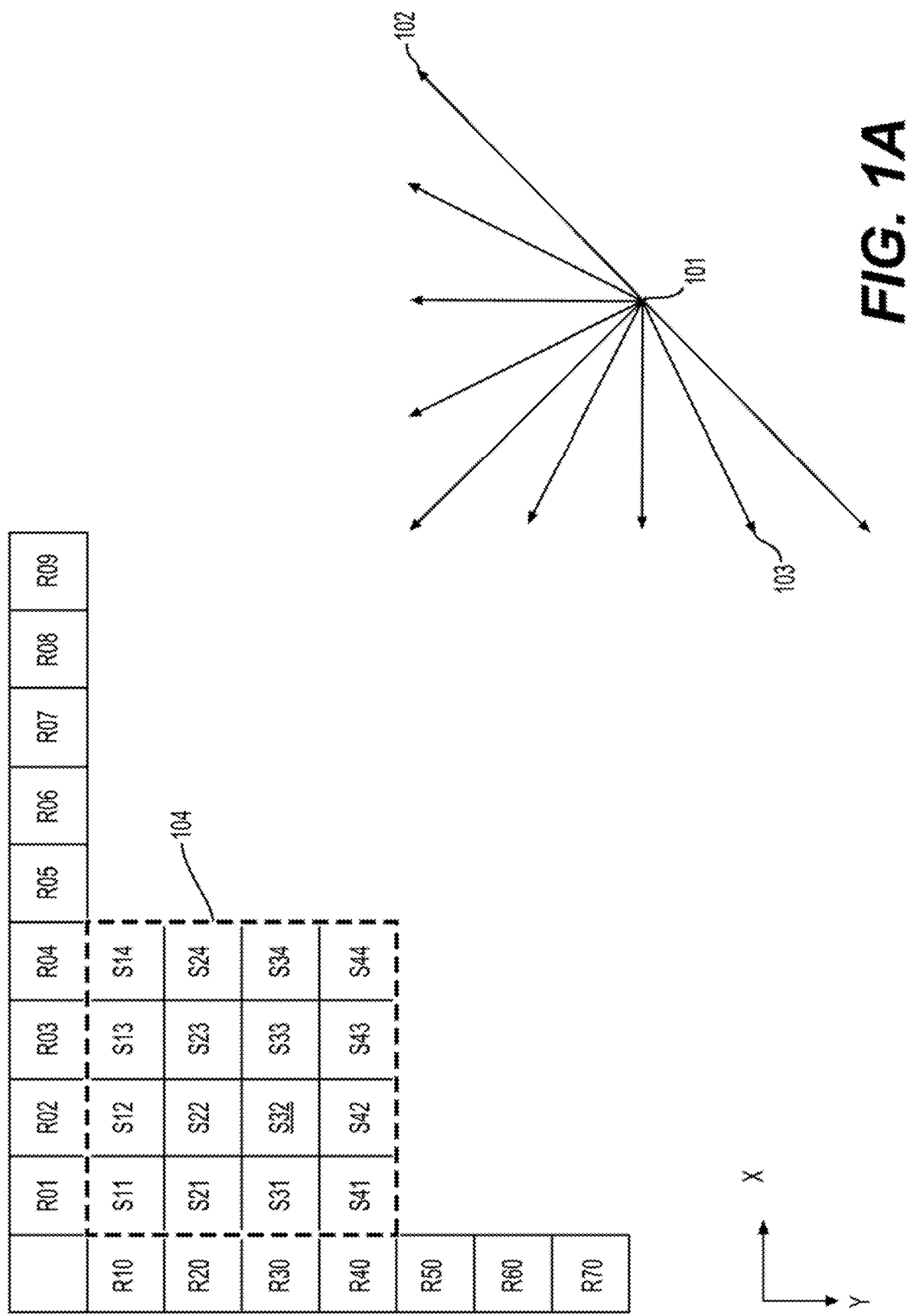
FIG. 1A is a schematic illustration of an example subset of intra prediction modes, according to an aspect of the disclosure.
Figure 1B:
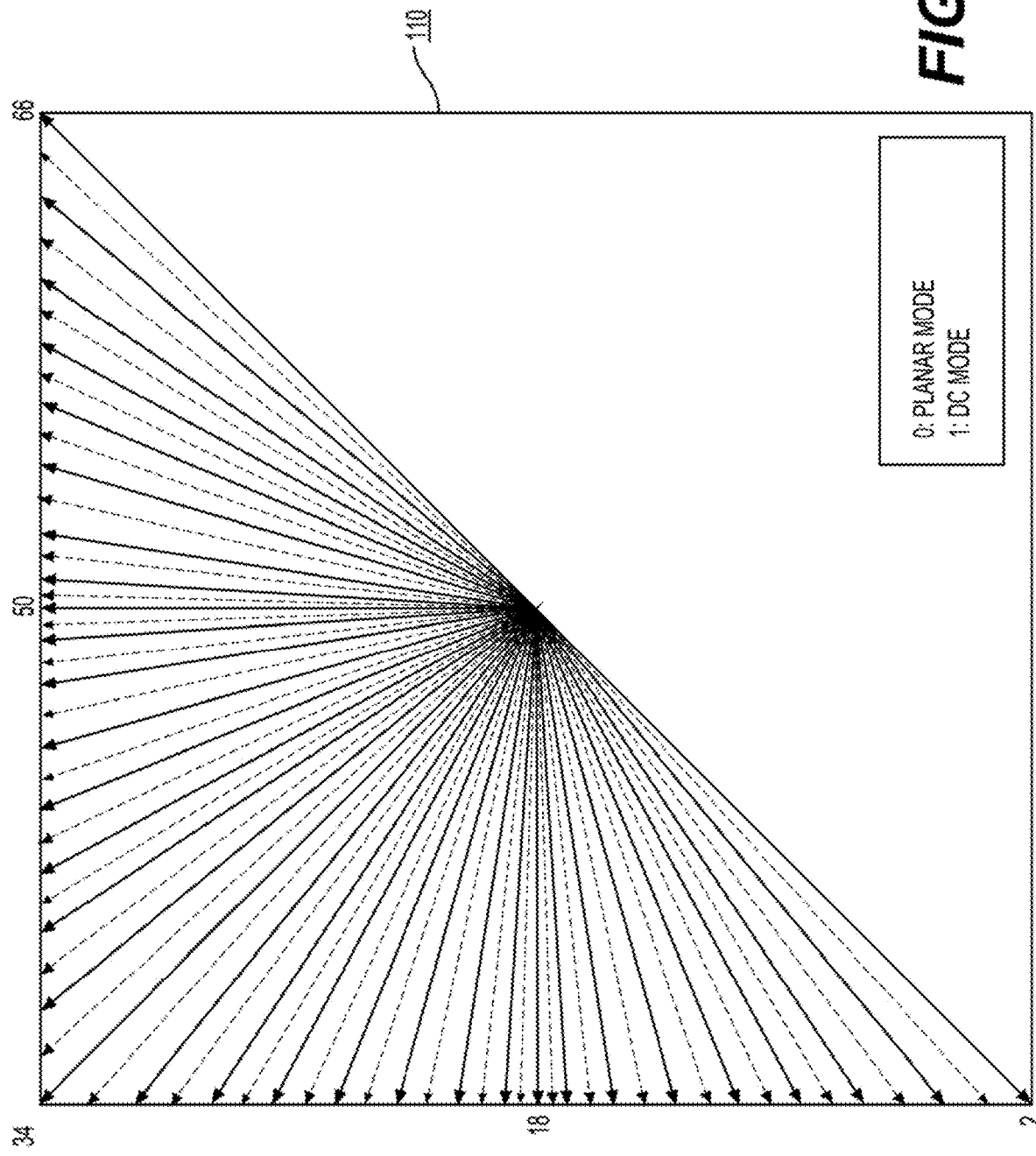
FIG. 1B is an illustration of example intra prediction directions, according to an aspect of the disclosure.
Figure 2:
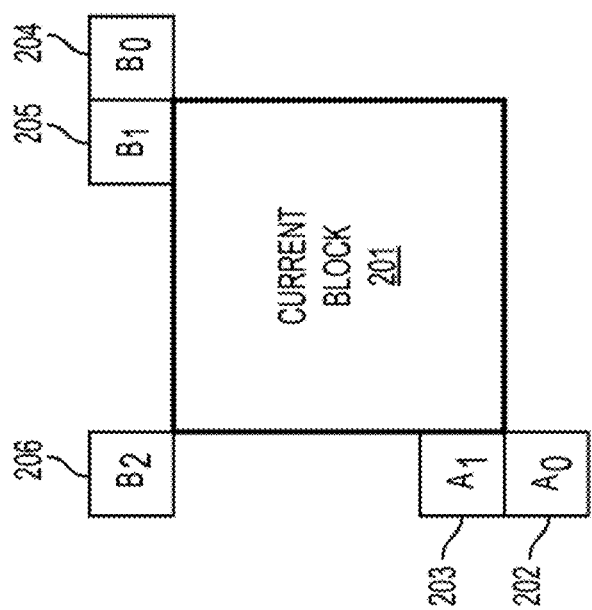
FIG. 2 a schematic illustration of an example of a current block and surrounding samples, according to an aspect of the disclosure.
Figure 3:
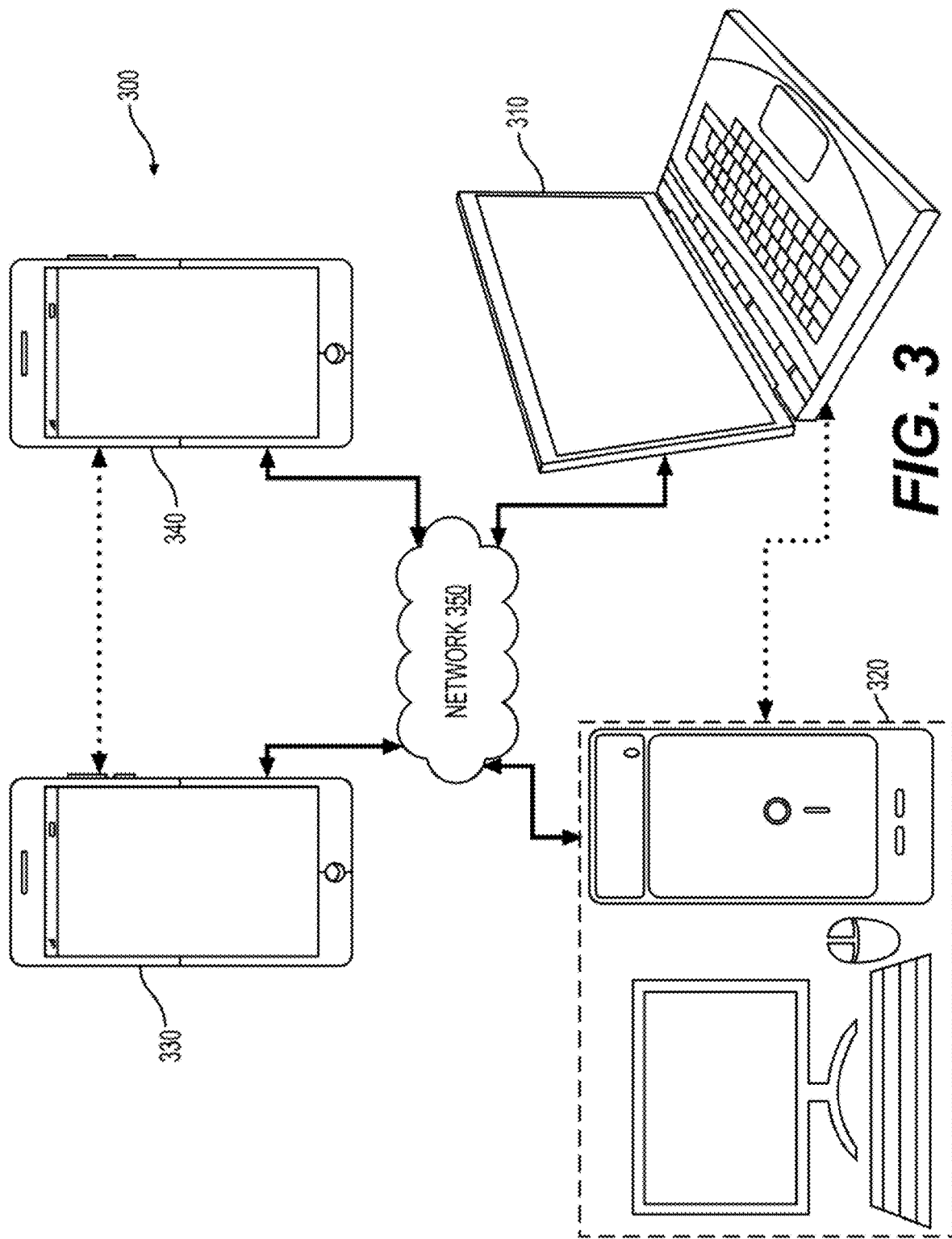
FIG. 3 is a schematic illustration of a block diagram of a first example communication system, according to an aspect of the disclosure.

FIG. 3 illustrates an example block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Aspects of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
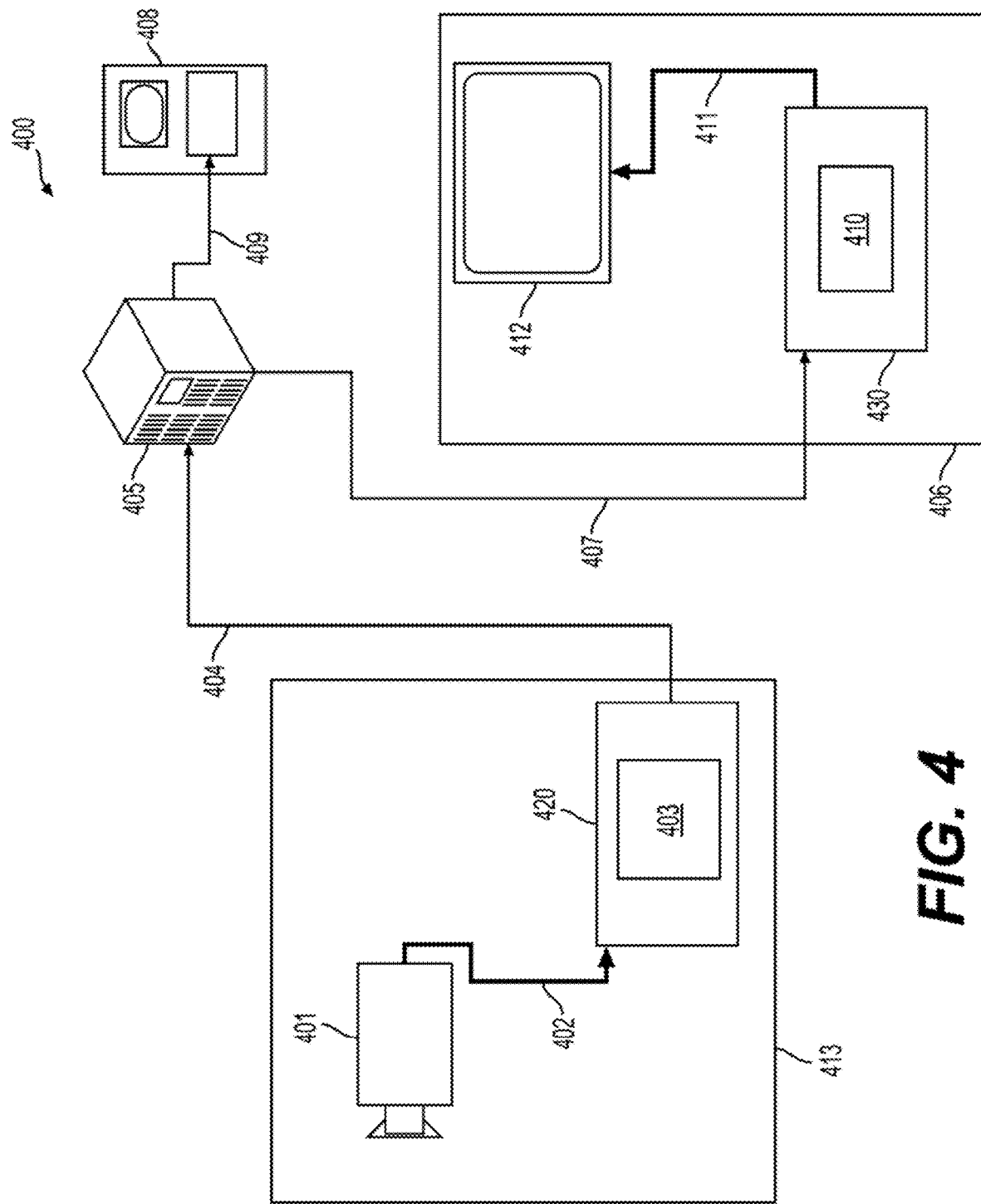
FIG. 4 is a schematic illustration of a block diagram of a second example communication system, according to an aspect of the disclosure.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
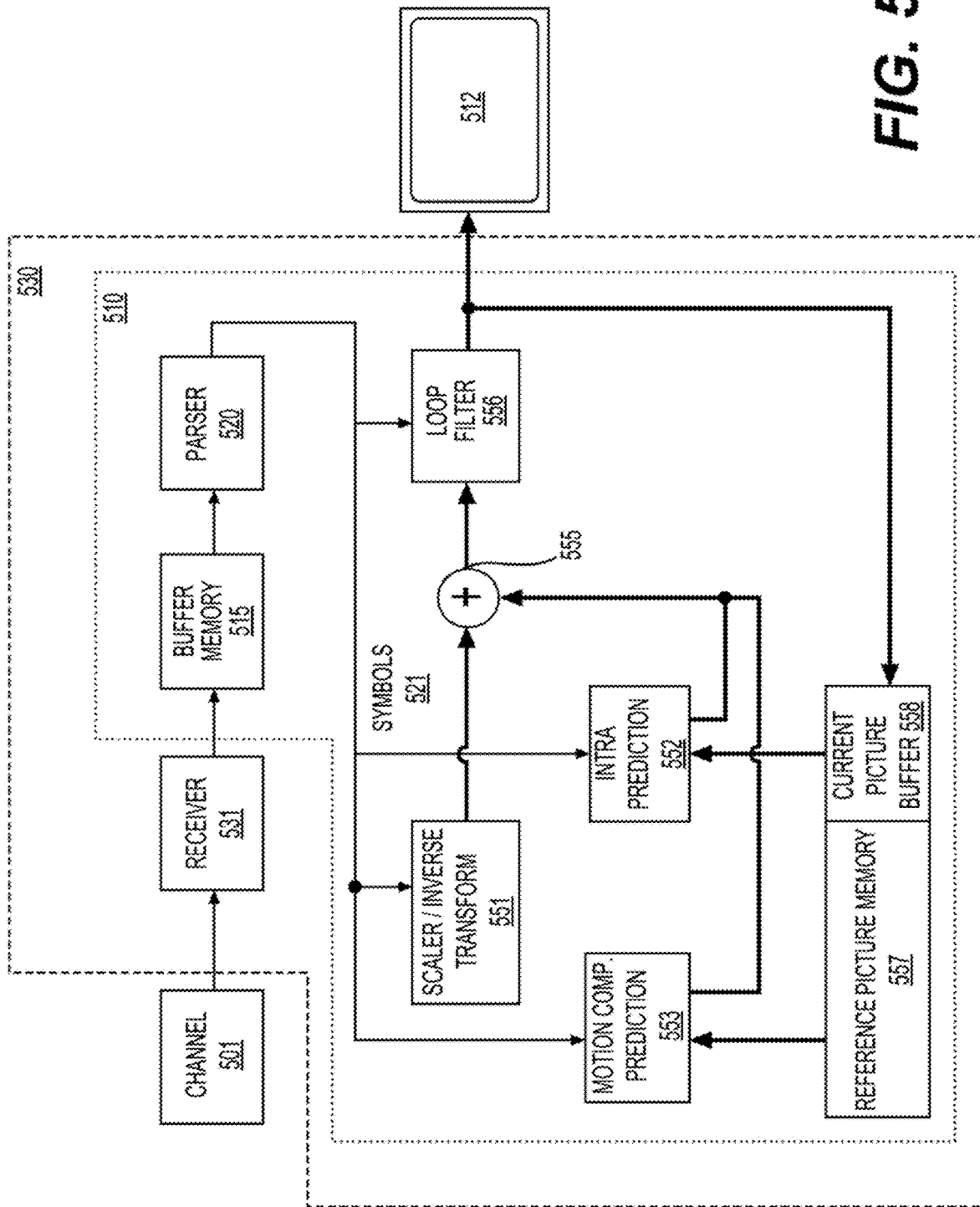
FIG. 5 is a schematic illustration of a block diagram of a first example decoder, according to an aspect of the disclosure.

FIG. 5 shows an example block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an aspect, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
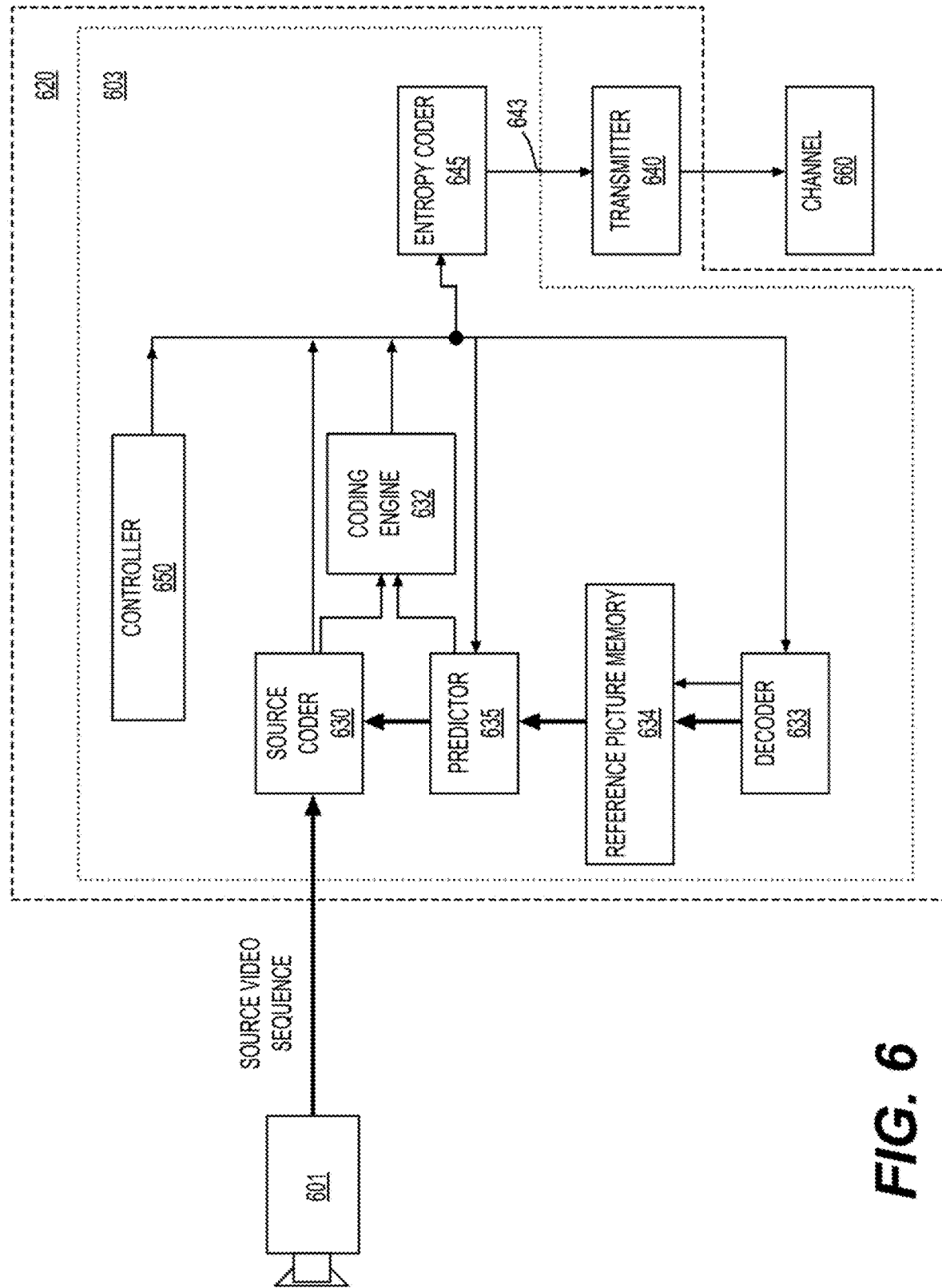
FIG. 6 is a schematic illustration of a block diagram of a first example encoder, according to an aspect of the disclosure.

FIG. 6 shows an example block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an aspect, the video encoder (603) may code and compress the pictures of the source video sequence into a coded video sequence (643) in real time or under any other time constraints as required. Enforcing appropriate coding speed is one function of a controller (650). In some aspects, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some aspects, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an aspect, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
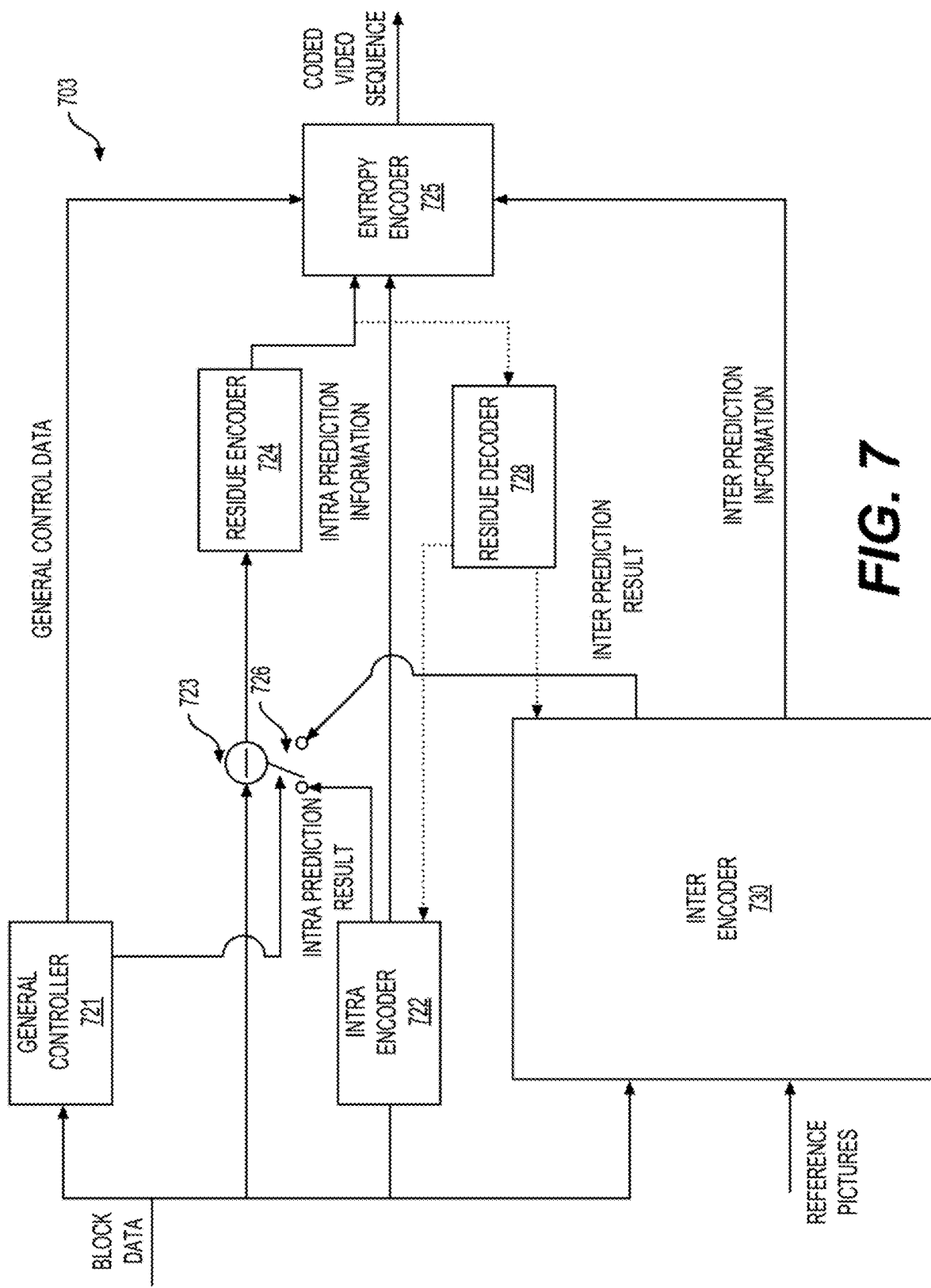
FIG. 7 is a schematic illustration of a block diagram of a second example encoder, according to an aspect of the disclosure.

FIG. 7 shows an example diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various aspects, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
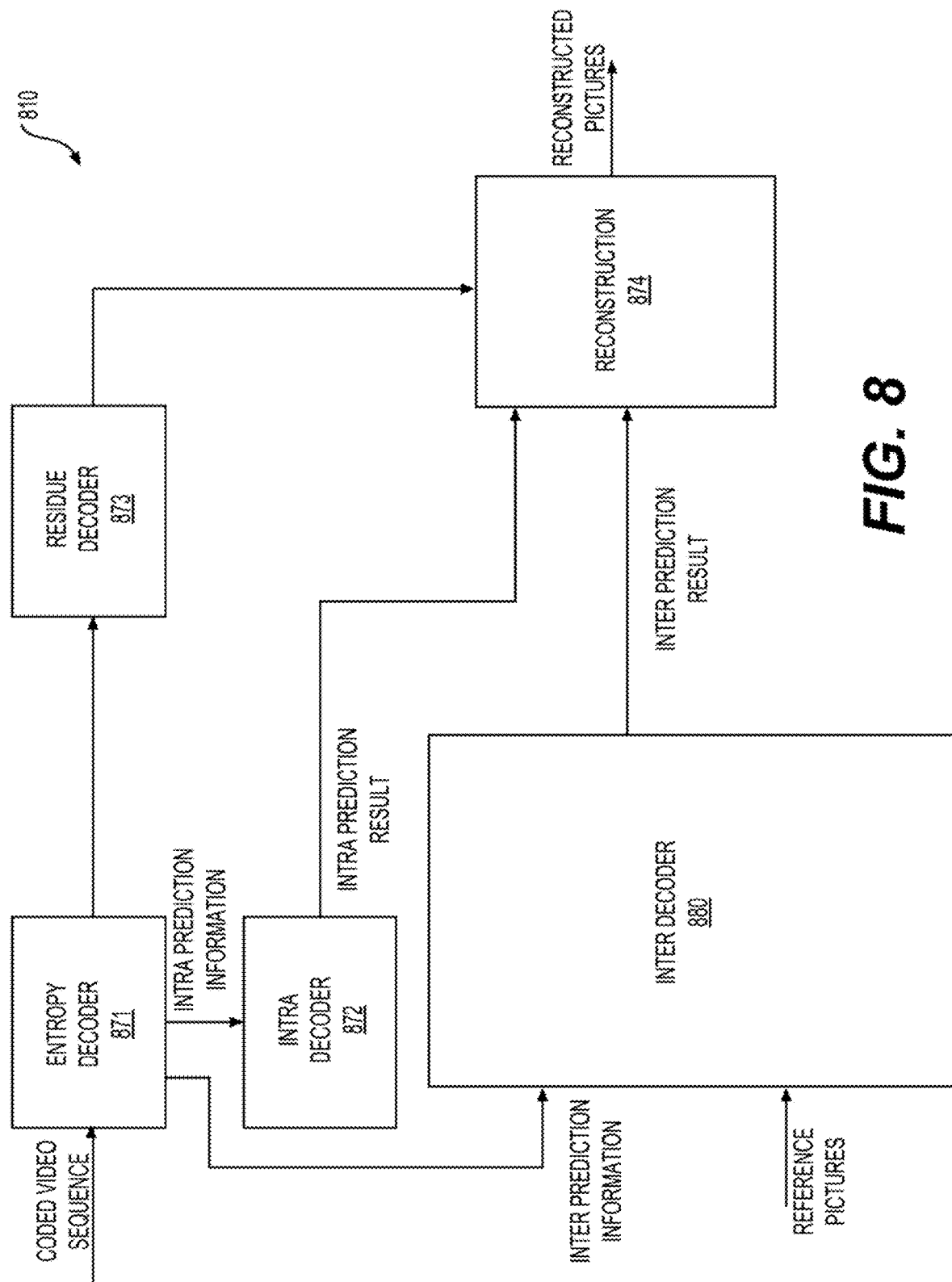
FIG. 8 is a schematic illustration of a block diagram of a second example decoder, according to an aspect of the disclosure.

FIG. 8 shows an example diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an aspect, the video encoders (403), (603), and (703), and the video decoders (410), (510), and (810) can be implemented using one or more integrated circuits. In another aspect, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a prediction unit (PU) and can have no significant residual coefficients, no coded motion vector delta or MV difference (e.g., MVD) or a reference picture index.

A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an aspect, such as in VVC, VVC Test model (VTM) reference software includes one or more refined inter prediction coding tools that include: an extended merge prediction, a merge with motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in detail below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from co-located CU(s), history-based MVP(s) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
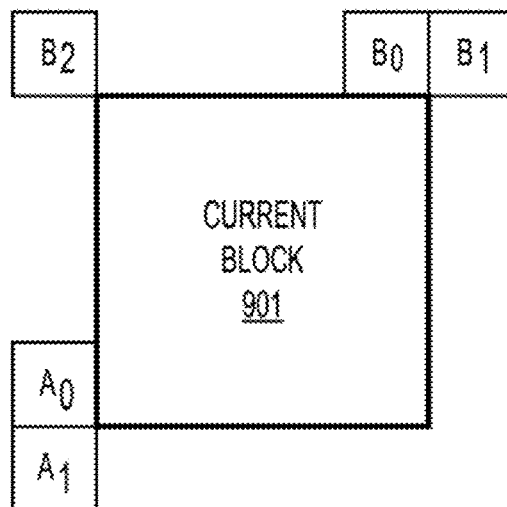
FIG. 9 is a schematic illustration of example positions of spatial merge candidates, according to an aspect of the disclosure.

Some examples of a generation process of each category of merge candidates are provided below. In an aspect, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an aspect of the disclosure. Referring to FIG. 9, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 10:
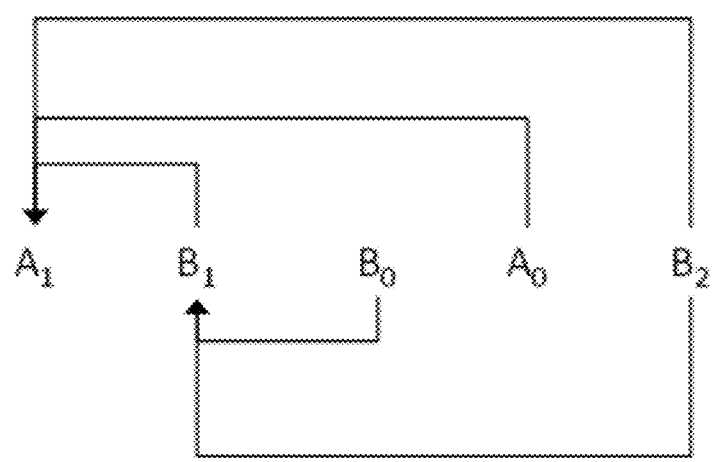
FIG. 10 is a schematic illustration of example candidate pairs that are considered for a redundancy check of spatial merge candidates, according to an aspect of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an aspect of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
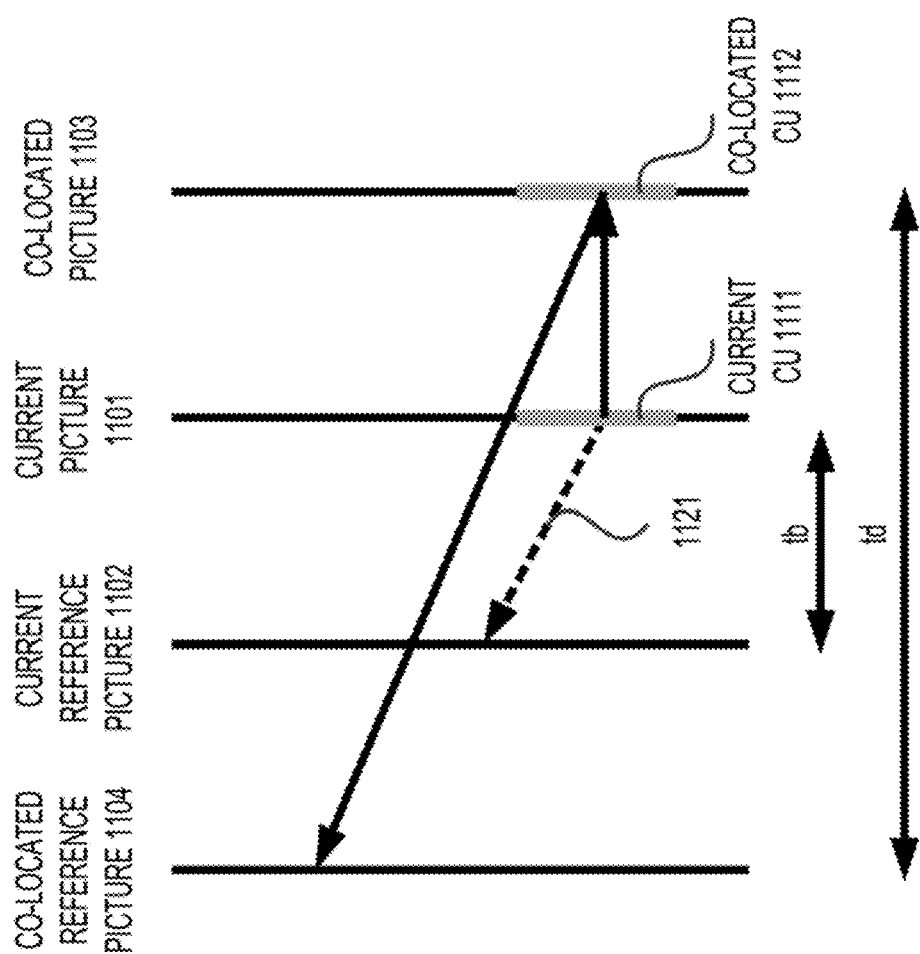
FIG. 11 is a schematic illustration of example motion vector scaling for a temporal merge candidate, according to an aspect of the disclosure.

In an aspect, temporal candidate(s) are derived as follows. In an example, only one temporal merge candidate is added to the candidate list. FIG. 11 shows example motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a co-located reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the co-located reference picture (1104) of the co-located picture (1103) and the co-located picture (1103). A reference picture index of the temporal merge candidate can be set to zero.

Figure 12:
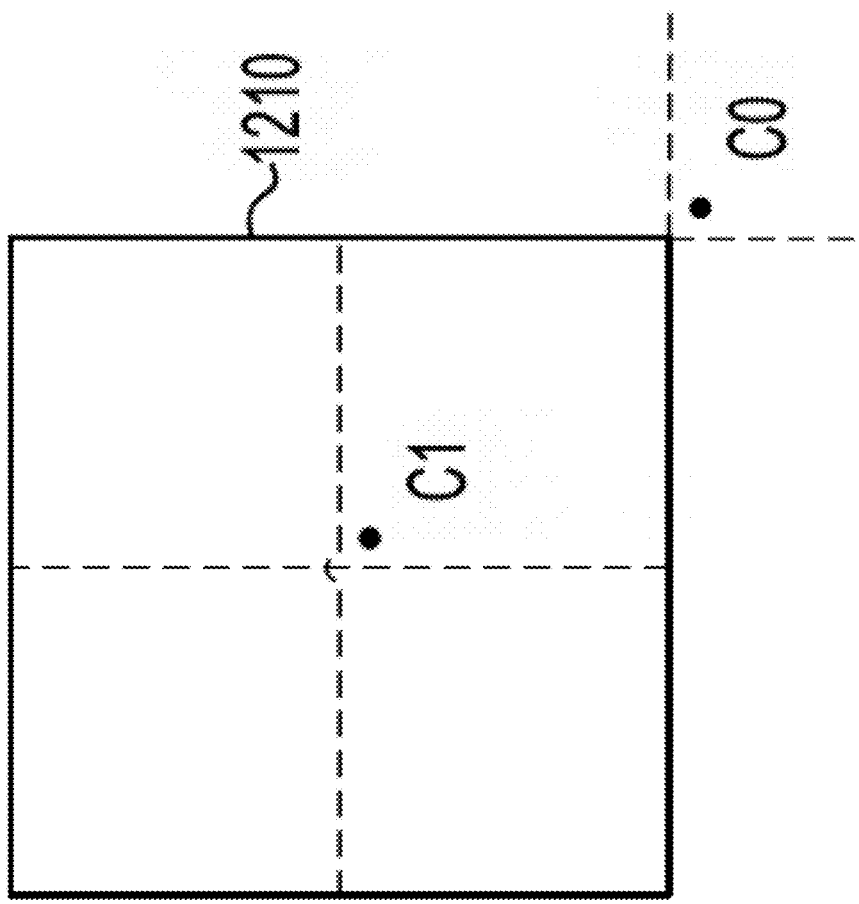
FIG. 12 is a schematic illustration of example candidate positions for a temporal merge candidate of a current coding unit, according to an aspect of the disclosure.

FIG. 12 shows example candidate positions (e.g., C0 and C1) for a temporal merge candidate of a current CU. A position for the temporal merge candidate can be selected between the candidate positions C0 and C1. The candidate position C0 is located at a bottom-right corner of a co-located CU (1210) of the current CU. The candidate position C1 is located at a center of the co-located CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

Figure 13:
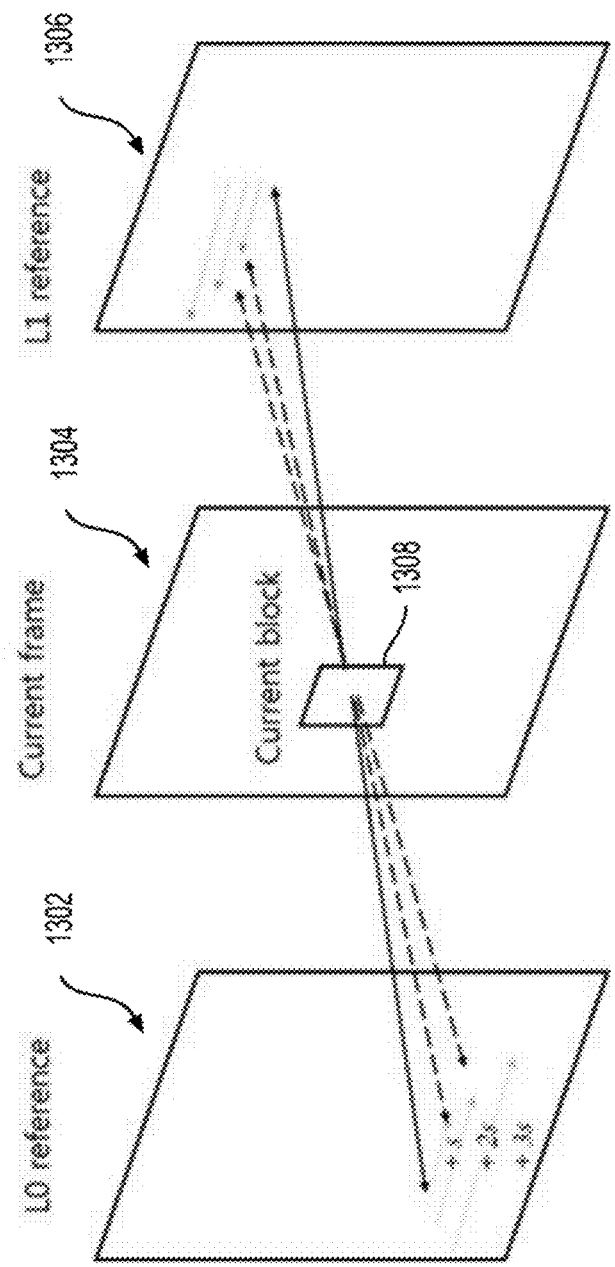
FIG. 13 a schematic illustration of an example Merge with Motion Vector Difference (MMVD) search process, according to an aspect of the disclosure.
Figure 14:
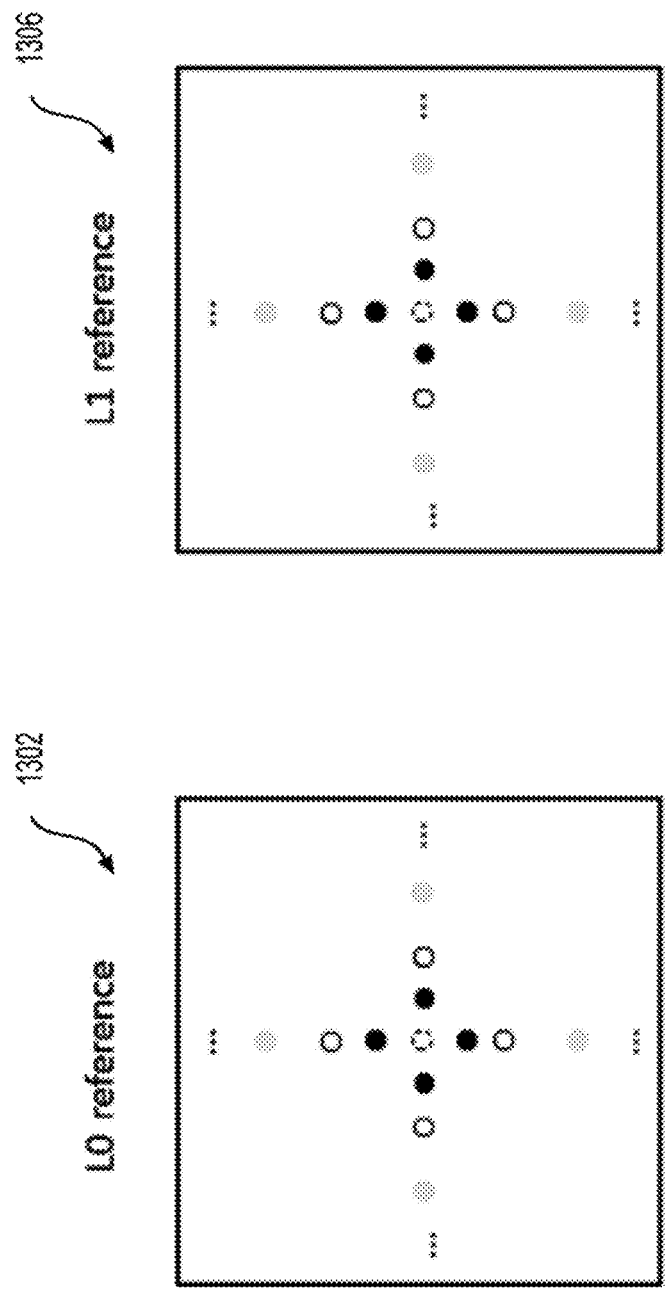
FIG. 14 a schematic illustration of example MMVD search points, according to an aspect of the disclosure.

In some systems, Merge with Motion Vector Difference (MMVD) is used for either skip or merge modes with a motion vector expression method. MMVD re-uses the merge candidates in VVC. FIG. 13 shows an example MMVD search process for a current block (1308) in a current frame (1304) using Reference Picture List 0 (L0) (1302) and Reference Picture List 1 (L1) (1306). In some aspects, the search is performed over MMVD search points in L0 (1302) and L1 (1306), where example search points are shown in FIG. 14. Among the merge candidates, a candidate can be selected, and is further expanded by motion vector expression. MMVD provides a motion vector expression with simplified signaling. The expression method includes starting point, motion magnitude, and motion direction.

MMVD technique uses a merge candidate list in VVC, but only candidates which are default merge type (MRG_TYPE_DEFAULT_N) are considered for MMVD's expansion. Base candidate index defines the starting point. Base candidate index indicates the best candidate among candidates in the list as follows, where MVP stands for motion vector predictor:

TABLE 1

Base candidate index (IDX)

| Base candidate IDX | 0 | 1 | 2 | 3 |
|---|---|---|---|---|
| $N^{th}$ MVP | $1^{st}$ MVP | $2^{nd}$ MVP | $3^{rd}$ MVP | $4^{th}$ MVP |

If the number of base candidates is equal to 1, Base candidate IDX is not signaled. Distance index is motion magnitude information. Distance index indicates the predefined distance from the starting point information. Predefined distance is as follows:

TABLE 2

Distance IDX

| | Distance IDX | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

TABLE 3

Direction IDX

| Direction IDX | 00 | 01 | 10 | 11 |
|---|---|---|---|---|
| x-axis | + | − | N/A | N/A |
| y-axis | N/A | N/A | + | − |

Direction index represents the direction of the MVD relative to the starting point. The direction index can represent one of the four directions. MMVD flag is signaled right after sending a skip flag and merge flag. If skip and merge flags are true, MMVD flag is parsed. If MMVD flage is equal to 1, MMVD syntaxes are parsed, but if not 1, AFFINE flag is parsed. If AFFINE flag is equal to 1, that is AFFINE mode, but if not 1, skip/merge index is parsed for VTM's skip/merge mode.

Figure 15:
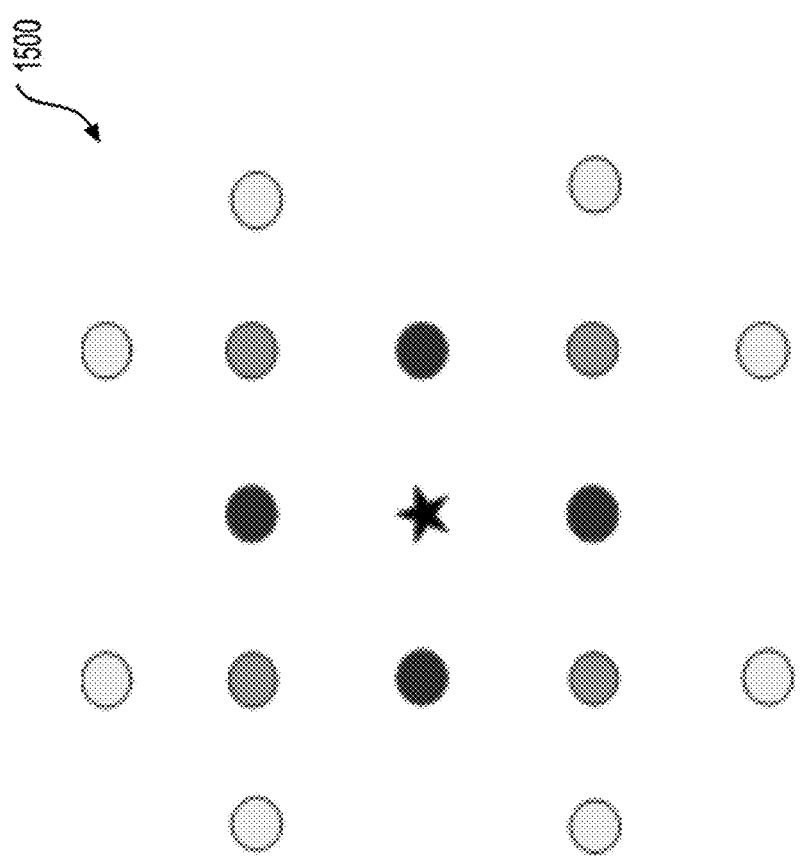
FIG. 15 a schematic illustration of example search points including additional directions along $k \times \pi/8$ diagonal angles, according to an aspect of the disclosure.

Template matching-based candidate reordering on MMVD and Affine MMVD can be used in some examples. In some systems, MMVD offsets (offsets in MMVD mode) are extended for MMVD and affine MMVD modes. Additional refinement positions along k×π/8 diagonal angles are added as shown in example search points (1500) in FIG. 15, thus increasing the number of directions from 4 to 16. Second, based on the sum of absolute difference (SAD) cost between the template (one row above and one column left to the current block) and its reference for each refinement position, all the possible MMVD refinement positions (16× 6) for each base candidate are reordered. The SAD between two blocks is the sum over all pixels of the absolute value of the difference of each pixel value between the two blocks. Finally, the top ⅛ refinement positions with the smallest template SAD costs are kept as available positions, consequently for MMVD index coding. The MMVD index is binarized by the rice code with the parameter equal to 2.

In one example, an offset of (1,1) applied to a base MV of (1,1) results in an MV of (2,2). Accordingly, the offset is an MVD that is applied on top of (i.e., in addition to) an MVP.

In another method, on top of the MMVD extension as described above, affine MMVD reordering is also extended, in which additional refinement positions along k×π/4 diagonal angles are added. After reordering, half of the refinement positions with the smallest template SAD costs are kept.

In order to improve the coding efficiency and reduce the transmission overhead of motion vector information, the subblock level motion vector refinement is applied to extend the CU level temporal motion vector prediction (TMVP). The subblock-based TMVP (SbTMVP) allows inheriting the motion information at subblock-level from a co-located reference picture. Each subblock of a large size CU can have its own motion information without explicitly transmitting the block partition structure or motion information. SbTMVP obtains motion information for each subblock in three steps. The first step is the derivation of a displacement vector (DV) of the current CU. Then it checks the availability of the SbTMVP candidate and derives the central motion. Finally, it can derive the subblock motion information from the corresponding subblock by the DV. Unlike TMVP candidate derivation which always derives the temporal motion vectors from the co-located block in the reference frame, SbTMVP applies a DV which is derived from the MV of the left neighboring CU of the current CU to find the corresponding subblock in the co-located picture for each subblock of the current CU. In case the corresponding subblock is not inter-coded, the motion information of the current subblock is set to be the central motion.

While an MV is a common terminology for the vector used for motion compensation in various modes, a DV is specifically defined for SbTMVP mode. In SbTMVP, a CU is split into multiple subblocks, and a position in a reference picture is identified to use corresponding subblocks for SbTMVP prediction. In this case, the vector pointing to the reference block position in the reference picture for SbTMVP is the DV. Generally, an MV could be used for a block or a subblock depending on the prediction mode. In SbTMVP mode, a DV points to a whole block for SbTMVP prediction, while an MV is used for motion compensation for a subblock after SbTMVP prediction.

VVC supports the SbTMVP method. Similar to TMVP in HEVC, SbTMVP uses the motion field in the co-located picture to improve motion vector prediction and merge mode for CUs in the current picture. The same co-located picture used by TMVP is used for SbTMVP. SbTMVP differs from TMVP in the following two main aspects. Firstly, TMVP predicts motion at CU level but SbTMVP predicts motion at sub-CU level. Secondly, whereas TMVP fetches the temporal motion vectors from the co-located block in the co-located picture (the co-located block is the bottom-right or center block relative to the current CU), SbTMVP applies a motion shift before fetching the temporal motion information from the co-located picture, where the motion shift is obtained from the motion vector from one of the spatial neighboring blocks of the current CU.

Figure 16:
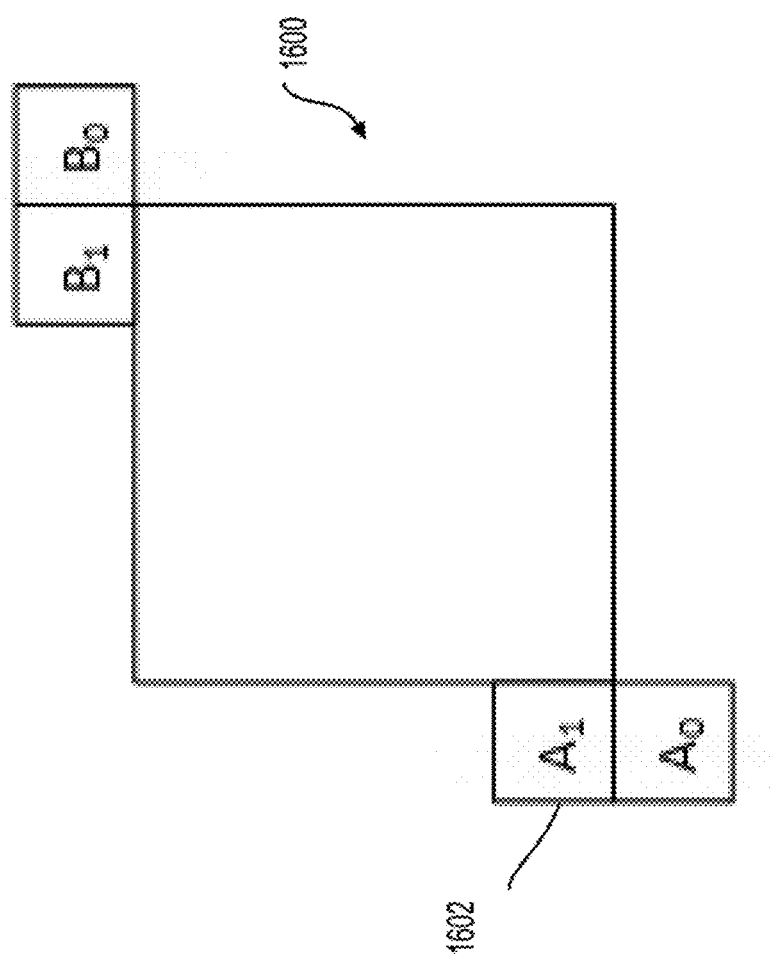
FIG. 16 a schematic illustration of an example of spatial neighboring blocks used by Advanced Temporal Motion Vector Prediction (ATVMP), in an example SbTMVP process in versatile video coding (VVC), according to an aspect of the disclosure.
Figure 17:
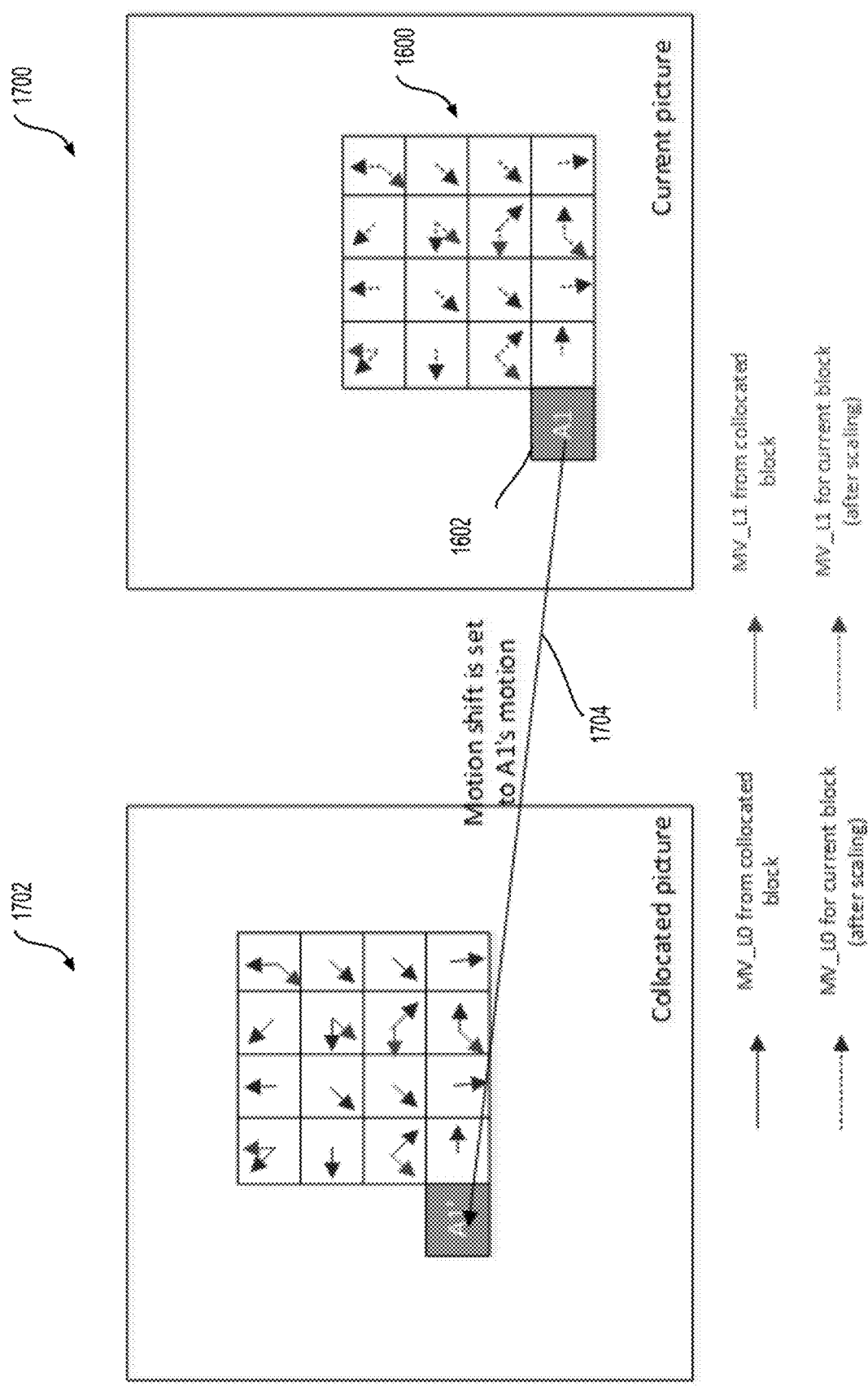
FIG. 17 a schematic illustration of an example of deriving sub-CU (sub-coding unit) motion field by applying a motion shift from spatial neighbor and scaling the motion information from the corresponding co-located sub-CUs, in an example SbTMVP process in VVC), according to an aspect of the disclosure.

The SbTMVP process is illustrated in FIGS. 16 and 17. SbTMVP predicts the motion vectors of the sub-CUs within a current CU (1600) in a current picture (1700) in two steps. In the first step, the spatial neighbor A1 (1602) is examined. If A1 (1602) has a motion vector (1704) that uses the co-located picture (1702) as its reference picture, this motion vector (1704) is selected to be the motion shift (or displacement vector) to be applied. If no such motion is identified, then the motion shift is set to (0, 0).

In the second step, the motion shift identified in Step 1 is applied (i.e., added to the current block's coordinates) to obtain sub-CU-level motion information (motion vectors and reference indices) from the co-located picture (1702) as shown in FIG. 17. The example in FIG. 17 assumes the motion shift is set to block A1's motion. Then, for each sub-CU, the motion information of its corresponding block (the smallest motion grid that covers the center sample) in the co-located picture (1702) is used to derive the motion information for the sub-CU. After the motion information of the co-located sub-CU is identified, it is converted to the motion vectors and reference indices of the current sub-CU in a similar way as the TMVP process of HEVC, where temporal motion scaling is applied to align the reference pictures of the temporal motion vectors to those of the current CU (1600).

In VVC, a combined subblock based merge list which contains both SbTMVP candidate and affine merge candidates is used for the signalling of subblock based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

In VVC, the sub-CU size used in SbTMVP is fixed to be 8×8, and as done for affine merge mode, SbTMVP mode is only applicable to the CU with both width and height larger than or equal to 8. The subblock size may be configurable to other sizes, such as 4×4, in the enhanced compression model (ECM) software model used for exploration beyond VVC.

In VVC and ECM, the subblock-based TMVP is allowed by using the DV which is only derived from the MV of the neighboring CU of the current CU. However, the SbTMVP with the derived DV may not be the best match.

The present aspects may be used separately or combined in any order. Further, the present aspects may be implemented by processing circuitry (e.g., one or more processors including processing circuitry, such as integrated circuits). In one example, the one or more processors execute a program that is stored in a non-transitory computer-readable medium.

As used herein, a template refers to a predefined neighboring reconstructed area of a current block. In one example, a template may include top N rows of top neighboring reconstructed samples, and/or left M columns of left neighboring reconstructed samples. Example values of M and N include, but are not limited to, 1, 2, 3, 4, . . . .

In some aspects, there may be one single DV predictor, but a DV offset is further signaled as a correction (such as MMVD) to the DV predictor to derive the final DV used in SbTMVP. The offset may be signaled, for example, by signaling an index out of a set of pre-agreed set of indices associated with a set of offsets. Alternatively, the set of DV offsets may be signaled in the coded bitstream. In some other aspects, there may be multiple DV predictors (or namely multiple base predictors) for deriving the final DV used in SbTMVP. In these cases, DV offset can be either signaled or not signaled in addition to the selected DV predictor.

For subblock-based TMVP (SbTMVP), when signaling an offset of the DV, some present aspects reorder the candidate DV offsets based on their associated cost values using template matching. The template of the current coding block is compared to the template of multiple blocks located at different candidate positions specified by the candidate DV offsets and the DV predictor (derived from the motion information of neighboring blocks, such as any spatial neighbor, or any temporal neighbor with scaling), and a cost value C is calculated for each candidate DV offset.

The cost value C represents a difference between sample values of the template of the current coding block and sample values of each candidate position specified by the candidate DV offsets and the DV predictor. That is, the cost value C represents a similarity degree between the sample values of the template of the current coding block and sample values of a corresponding candidate position. For example, a low value of C may indicate a high degree of similarity between the sample values of the template of the current block and the sample values of a corresponding candidate position and a high value of C may indicate a low degree of similarity.

Accordingly, the cost value C calculated for each candidate DV offset represents a degree of similarity between the sample values of the template of the current coding and the sample values of a candidate position represented by a combination of the DV predictor and the respective candidate DV offset. Based on the cost values, the DV offset candidates are reordered, for example, based on ascending or descending order.

Figure 18:
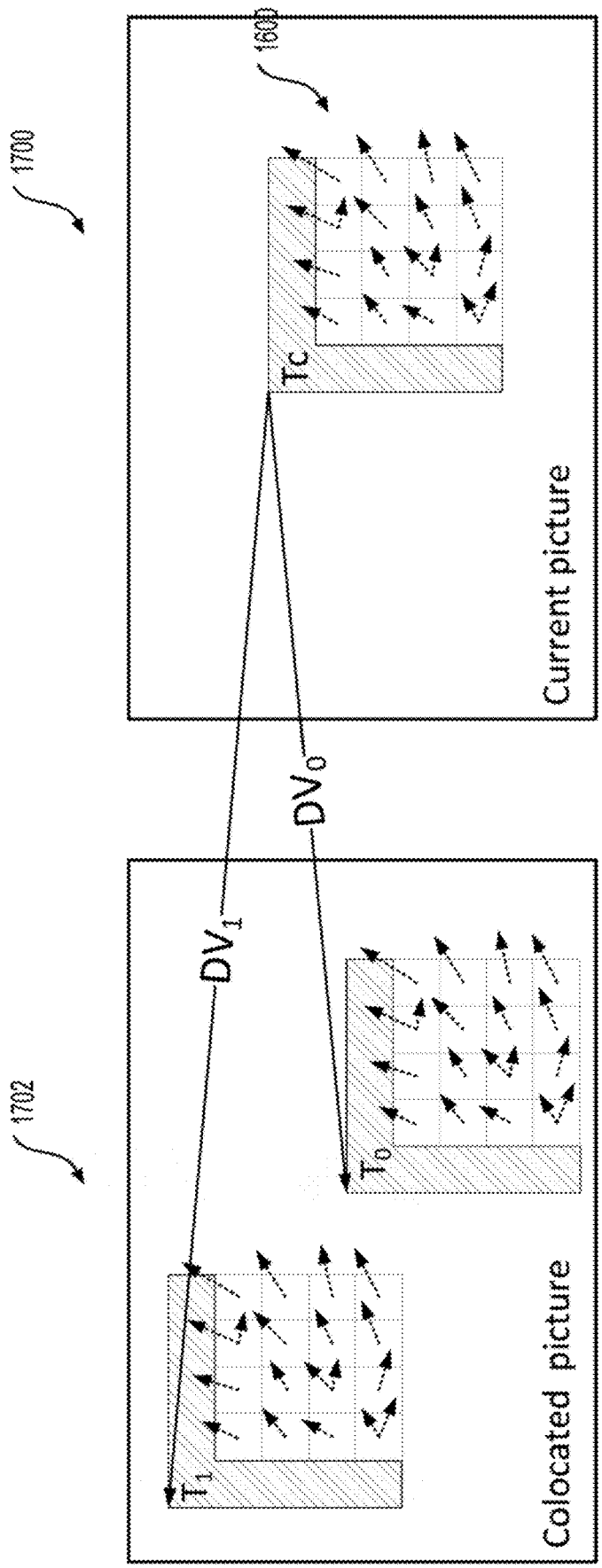
FIG. 18 a schematic illustration of an example of template matching associated with multiple displacement vectors (DVs), according to an aspect of the present disclosure.

An example of this is illustrated in FIG. 18, in which the template of the current block (1600) is Tc, and after template matching, T0 and T1 are the templates associated with two example candidate DVs, which are derived by different DV offset values applied to a DV predictor. The cost values are calculated for each DV offset candidate, and then based on the costs, the DV offset candidate indices (e.g., MMVD indices) are reordered, and a selected index in the reordered indices is further signalled by the encoder to the decoder to indicate the selected DV offset. The selected DV offset may then be used, in combination with a DV predictor, to predict/reconstruct the current coding block in the SbTMVP mode.

In some aspects, the selected index may be selected by default as the index associated with the smallest cost calculated above, without additional signaling. In some other aspects, the selected index may be associated with the smallest prediction cost.

The shape of the template used in various aspects is not limited to the shape illustrated in FIG. 18. For example, in various aspects, the template may include only one or more neighboring cells above a block, only one or more neighboring cells to the left of the block, any combination of one or more neighboring cells above a block and one or more neighboring cells to the left of the block, etc.

In various alternative aspects, the cost value C can be calculated by Sum of Absolute Differences (SAD), Sum of Absolute Transformed Differences (SATD), Sum of Squared Error (SSE), sub-sampled SAD, mean-removed SAD, etc., between the sample values of the template of the current block and the sample values of the templates of the candidate blocks. The various calculation methods of the cost value C represent a degree of similarity between the sample values of the template of the current block and the sample values of the corresponding candidate positions. For example, when samples of a template of the current block and samples of a template at one of the candidate positions are very similar, the cost value C may be very low to represent a high degree of similarity between the template of the current block and the template at that candidate position.

In one aspect, only some of the candidates on a list (which may include MMVD or other candidates) are measured by template matching and their associated indices are reordered. For the remaining candidates on the list, the relative order is kept unchanged. For example, assuming that there are 8 possible directions including two horizontal directions, two vertical directions, and four 45 degree directions, the probability of using one of the four 45 degree directions may be low relative to the other directions. In this case, template matching, cost calculation, and index reordering may be performed only for the two horizontal directions and the two vertical directions that sit at the top of the candidate list, while the index order of the four 45 degree directions at the bottom of the candidate list is kept unchanged. This reduces computational complexity.

In one aspect, the template matching cost of all candidates on a list (which may include MMVD or other candidates) are measured, and all candidates are reordered. After reordering, only the top N candidates (N less than or equal to the total number of candidates) which have the lowest cost are assigned an index in the range of [0, N−1], and the index is signaled into the bitstream to indicate which candidate is used. The number N can be predefined or signaled into the high-level syntax such as sequence parameter set (SPS), picture parameter set (PPS), picture header (PH), slice header (SH), etc.

For SbTMVP, when multiple DV predictors are available, and the selection of a DV predictor is signaled, some present aspects reorder the DV predictors based on their associated cost value derived by template matching. Based on the cost values, the candidate DV predictors are reordered based on ascending or descending order, and a selected DV predictor's index in the reordered indices is signalled to indicate which DV predictor is applied for deriving the DV used in SbTMVP. The selected DV predictor may be the first or the last predictor on the list, or may be another DV predictor on the list with the lowest prediction cost.

In some systems, for SbTMVP, a list of derived DVs (i.e., when the DV predictor is directly used without further signaling a DV offset) can be constructed from methods, such as spatial neighboring CUs or from history-based motion vector prediction (HMVP) candidates. Over all candidate DVs in the list, the cost values C between these and the current block is calculated by template matching. The list is reordered in descending or ascending order of the cost values C. An index is signaled into the bitstream to indicate which derived DV in the list is used. The template matching-based reordering is beneficial in that the most useful DV candidate will have a shorter codeword and will have an efficient context model for entropy coding.

In one aspect, after reordering, only the first N candidate DVs on the list may be assigned an index for signaling, so that the signaling cost may be reduced according to the value of N.

In another aspect, after reordering of the candidate DVs, the first candidate DV with the lowest template matching cost may be used by default, so that no signaling is required for indicating the index of candidate DVs.

In another aspect, any of candidate DVs on the reordered list may be signaled by an index in the bitstream. For example, a candidate DV with a lowest prediction cost may be signaled by an index in the bitstream.

Some aspects may put multiple DV predictor candidates and/or a DV predictor with multiple DV offsets together into one single DV candidate list. All the DV candidates may then be reordered based on template matching cost. The index of a candidate selected from the reordered list maybe signaled in the bitstream.

In one aspect, all possible DV candidates generated by adding offsets on top of all DV predictors are reordered by using template matching cost in ascending or descending order to construct a template matching-based candidate list. An index is signaled in the bitstream to indicate which candidate in the above list is selected. Accordingly, no base DV predictor signaling is necessary.

In one aspect, all possible DV predictor candidates and all possible candidates generated by adding offsets to base predictors are put together and reordered based on template matching cost in ascending order to form a reordered candidate list. An index is signaled to indicate which candidate in the list is selected. This indicated candidate may be the SbTMVP candidate with one of multiple base DV candidates or an SbTMVP-MMVD candidate with an offset on top of one of multiple base DV candidates.

In one example, this template matching based reordered SbTMVP candidate list may be constructed as an independent candidate list, and the SbTMVP candidate is not included in the affine merge candidate list when the template matching based reordering of SbTMVP candidate list is enabled for the current frame. When a subblock merge mode is signaled, an additional syntax may be signaled at coding block level to indicate whether to construct this SbTMVP list or the affine merge list.

In one aspect, the template matching based candidate reordering may be applied when a base DV predictor is determined, and all the candidates generated by adding DV offsets on top of the DV predictor may be reordered based on their template matching cost, so that the signaling of the base DV predictor and the signaling of the candidate index of the reordered list may be done separately.

Figure 19:
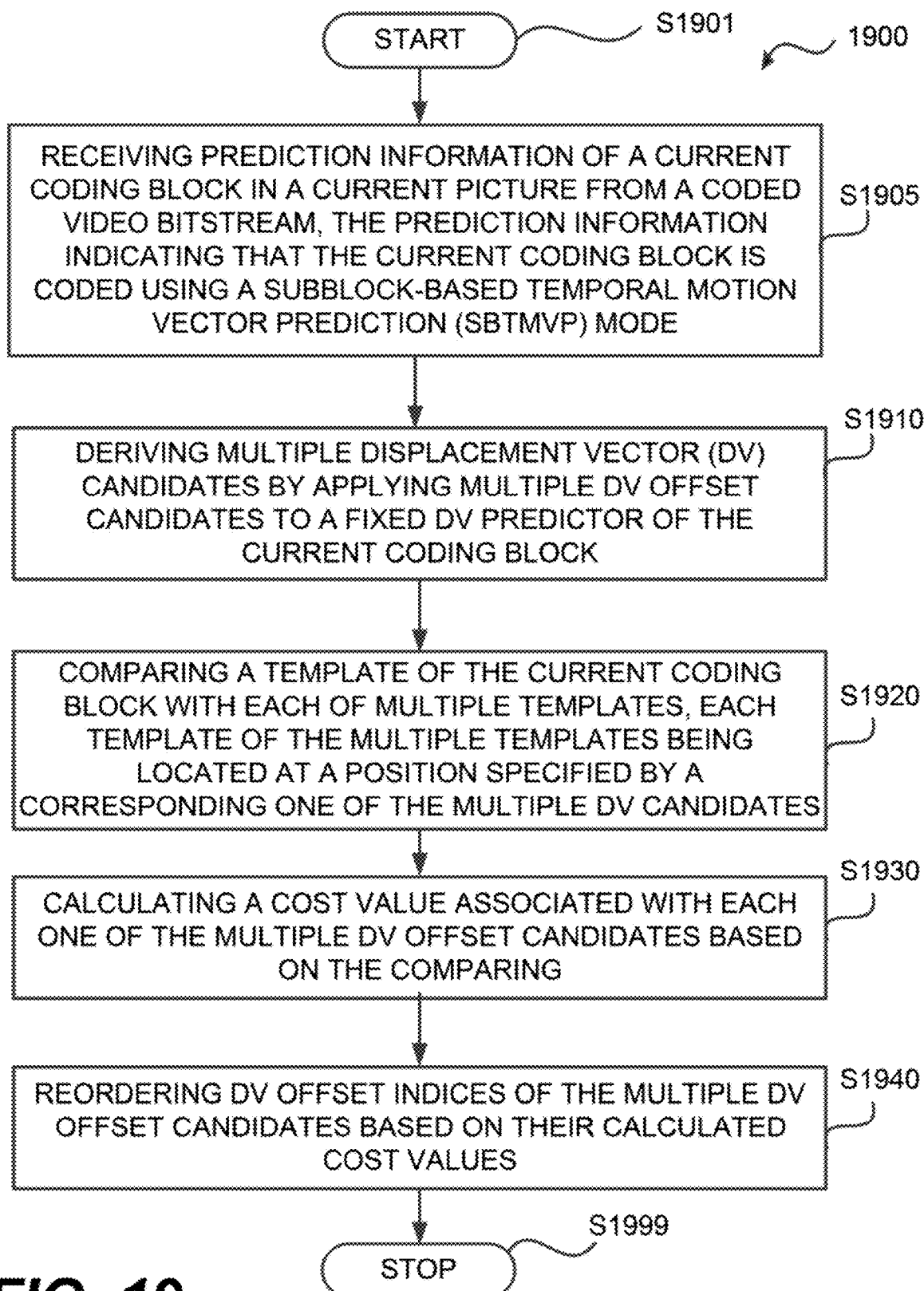
FIG. 19 shows a flow chart outlining a first encoding/decoding process, according to an aspect of the disclosure.
Figure 20:
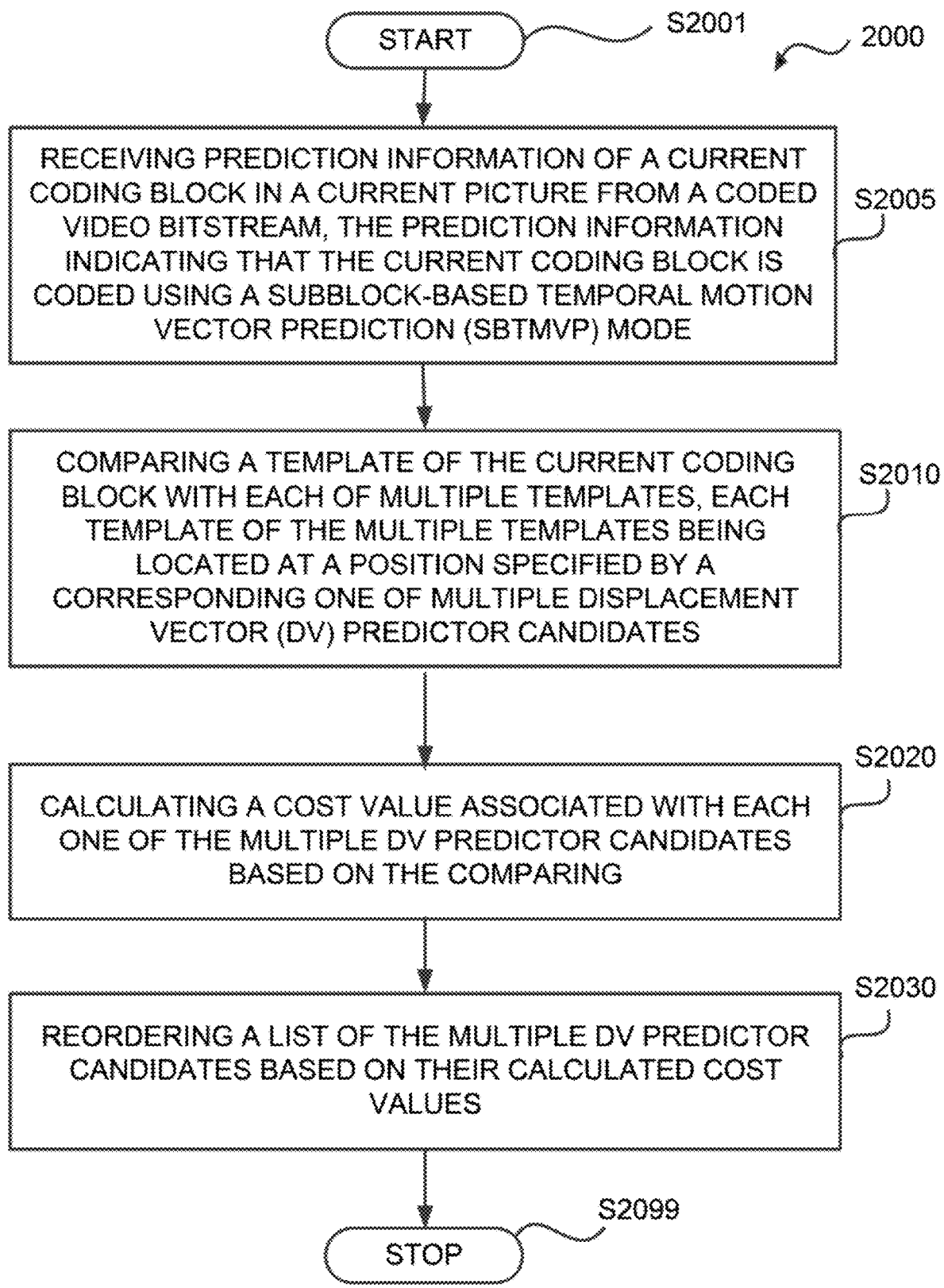
FIG. 20 shows a flow chart outlining a second encoding/decoding process, according to an aspect of the disclosure.
Figure 21:
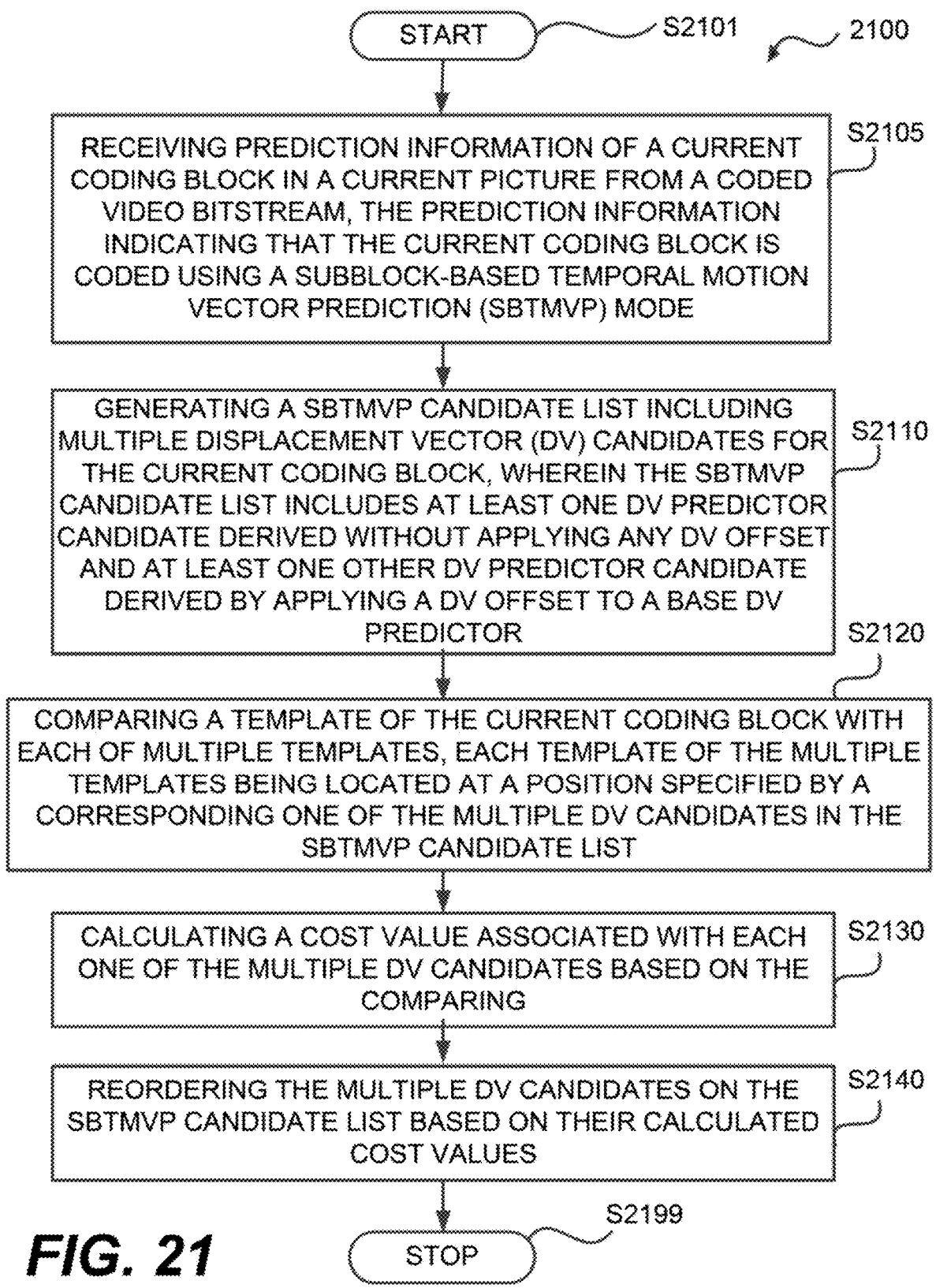
FIG. 21 shows a flow chart outlining a third encoding/decoding process, according to an aspect of the disclosure.

FIGS. 19-21 show example flow charts outlining encoding/decoding processes (1900, 2000, 2100) for SbTMVP, according to various aspects of the disclosure. In various aspects, each one of the processes (1900, 2000, 2100) may be executed by processing circuitry, such as the processing circuitry in the terminal devices (310), (320), (330) and (340), the processing circuitry that performs functions of a video encoder (e.g., (403), (603), (703)), the processing circuitry that performs functions of a video decoder (e.g., (410), (510), (810)), and the like. In some aspects, each one of the processes (1900, 2000, 2100) may be implemented in software instructions, thus when the processing circuitry executes the software instructions, the processing circuitry performs one of the processes (1900, 2000, 2100). Each one of the processes (1900, 2000, 2100) can be suitably adapted to various scenarios, and steps in each one of the processes (1900, 2000, 2100) can be adjusted accordingly. One or more of the steps in each one or the processes (1900, 2000, 2100) can be adapted, omitted, repeated, and/or combined. Any suitable order can be used to implement each one of the processes (1900, 2000, 2100). Additional step(s) can be added.

Referring first to FIG. 19, the process (1900) starts at (S1901), and proceeds to (S1910).

At (S1905), the process (1900) receives prediction information of a current coding block in a current picture from a coded video bitstream, the prediction information indicating that the current coding block is coded using a subblock-based temporal motion vector prediction (SbTMVP) mode.

At (S1910), the process (1900) derives multiple displacement vector (DV) candidates by applying multiple DV offset candidates to a fixed DV predictor of the current coding block.

At (S1920), the process (1900) compares a template of the current coding block with each of multiple templates, each template of the multiple templates being located at a position specified by a corresponding one of the multiple DV candidates.

At (S1930), the process (1900) calculates a cost value associated with each one of the multiple DV offset candidates based on the comparing.

At (S1940), the process (1900) reorders DV offset indices of the multiple DV offset candidates based on their calculated cost values.

In an example, the process (1900) may further receive an index signaled in the coded video bitstream, wherein the index indicates which DV offset candidate is selected for performing SbTMVP.

In an example, after the reordering, the process (1900) may further select a DV offset candidate with a lowest calculated template matching cost by default for performing SbTMVP. Accordingly, no signaling is needed for the selected DV offset.

In an example, the cost value is calculated by performing Sum of Absolute Differences (SAD), Sum of Absolute Transformed Differences (SATD), Sum of Squared Error (SSE), sub-sampled SAD, or mean-removed SAD.

In an example, the multiple DV candidates comprise Merge with Motion Vector Difference (MMVD) candidates.

In an example, the comparing, the calculating, and the reordering are performed only for a subset of the MMVD candidates, wherein a relative order of one or more other ones of the MMVD candidates is kept unchanged.

In an example, the comparing, the calculating, and the reordering are performed for all of the MMVD candidates, wherein after reordering only a number N of the MMVD candidates which have a lowest cost are used, wherein the number N is less than or equal to a total number of the MMVD candidates.

In an example, an index in a range of [0, N−1] is signaled into a bitstream to indicate which MMVD candidate is used, wherein the number N is predefined or is signaled into a high-level syntax.

In an example, the DV offset indices are reordered by descending or ascending order of their calculated cost values.

The process (1900) then proceeds to (S1999), and terminates.

Referring next to FIG. 20, the process (2000) starts at (S2001), and proceeds to (S2010).

At (S2005), the method (2000) receives prediction information of a current coding block in a current picture from a coded video bitstream, the prediction information indicating that the current coding block is coded using a subblock-based temporal motion vector prediction (SbTMVP) mode.

At (S2010), the process (2000) compares a template of the current coding block with each of multiple templates, each template of the multiple templates being located at a position specified by a corresponding one of multiple displacement vector (DV) predictor candidates.

At (S2020), the process (2000) calculates a cost value associated with each one of the multiple DV predictor candidates based on the comparing.

At (S2030), the process (2000) reorders a list of the multiple DV predictor candidates based on their calculated cost values.

In an example, the process (2000) further receives an index signaled in the coded video bitstream, wherein the index indicates which DV predictor candidate is selected from the reordered list of the multiple DV predictor candidates for performing SbTMVP.

In an example, after the reordering, the process (2000) further selects a DV predictor candidate with a lowest calculated template matching cost by default for performing SbTMVP.

In an example, the list of the multiple DV predictor candidates is constructed from spatial neighboring coding units (CUs) or from history-based motion vector prediction (HMVP) candidates.

In an example, after the reordering, only a first N number of the multiple DV predictor candidates on the list are signaled.

In an example, the multiple DV predictor candidates in the list are reordered by descending or ascending order of their calculated cost values.

The process (2000) then proceeds to (S2099), and terminates.

Referring next to FIG. 21, the process (2100) starts at (S2101), and proceeds to (S2110).

At (S2105), the process (2100) receives a prediction information of a current coding block in a current picture from a coded video bitstream, the prediction information indicating that the current coding block is coded using a subblock-based temporal motion vector prediction (SbTMVP) mode.

At (S2110), the process (2100) generates a SbTMVP candidate list including multiple displacement vector (DV) candidates for the current coding block, wherein the SbTMVP candidate list includes at least one DV predictor candidate derived without applying any DV offset and at least one other DV predictor candidate derived by applying a DV offset to a base DV predictor.

At (S2120), the process (2100) compares a template of the current block with each of multiple templates, each template of the multiple templates being located at a position specified by a corresponding one of the multiple DV candidates in the SbTMVP candidate list.

At (S2130), the process (2100) calculates a cost value associated with each one of the multiple DV candidates based on the comparing.

At (S2140), the process (2100) reorders the multiple DV candidates on the SbTMVP candidate list based on their calculated cost values.

In an example, the process (2100) further receives an index signaled in the coded video bitstream, wherein the index indicates which DV candidate is selected from the reordered SbTMVP candidate list for performing SbTMVP.

In an example, the selected DV candidate is a SbTMVP DV candidate derived without applying any DV offset or is a SbTMVP Merge with Motion Vector Difference (MMVD) candidate derived by applying a respective DV offset to a respective base DV predictor.

In an example, when the selected DV candidate is the SbTMVP MMVD candidate, a signaling of the respective base DV predictor and a signaling of an index of the respective DV offset are performed separately.

In an example, the SbTMVP candidate list is constructed independently of an affine merge candidate list when template matching based reordering of candidates is enabled for a current frame, wherein when a subblock merge mode is signaled, an additional syntax is signaled at coding block level to indicate whether to construct the SbTMVP candidate list or the affine merge candidate list.

The process (2100) then proceeds to (S2199), and terminates.

Aspects in the disclosure may be used separately or combined in any order. Further, each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above can be implemented as computer software using computer-readable instructions and physically stored in one or more computer-readable media. For example, FIG. 22 shows a computer system (2200) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
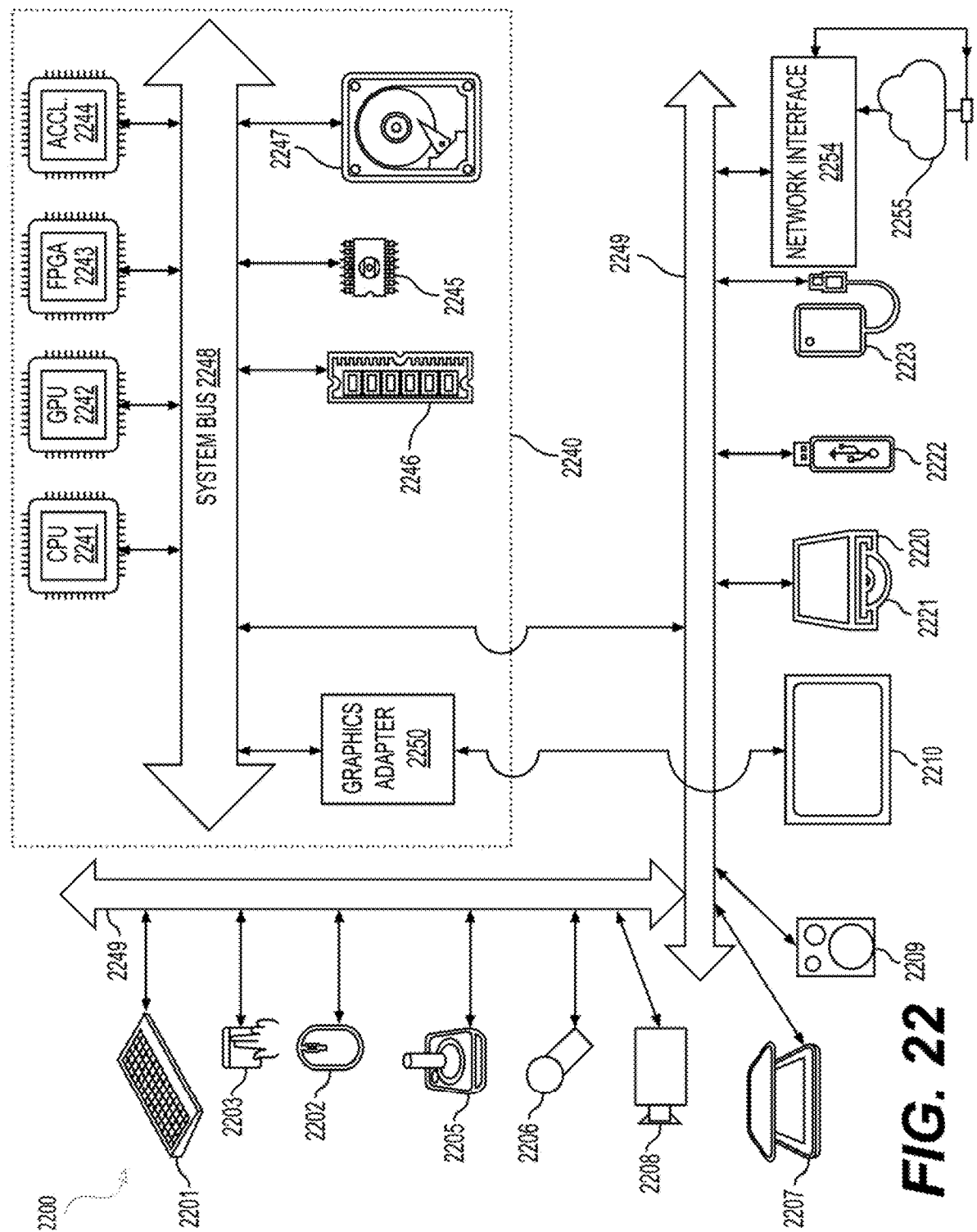
FIG. 22 is a schematic illustration of a computer system in accordance with an aspect.

The components shown in FIG. 22 for computer system (2200) are example in nature and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch-screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various aspects of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Some Acronyms used herein include the following.
JEM: joint exploration model.
VVC: versatile video coding.
BMS: benchmark set.
MV: Motion Vector.
HEVC: High Efficiency Video Coding.
SEI: Supplementary Enhancement Information.
VUI: Video Usability Information.
GOPs: Groups of Pictures.
TUs: Transform Units.
PUs: Prediction Units.
CTUs: Coding Tree Units.
CTBs: Coding Tree Blocks.
PBs: Prediction Blocks.
HRD: Hypothetical Reference Decoder.
SNR: Signal Noise Ratio.
CPUs: Central Processing Units.
GPUs: Graphics Processing Units.
CRT: Cathode Ray Tube.
LCD: Liquid-Crystal Display.
OLED: Organic Light-Emitting Diode.
CD: Compact Disc.
DVD: Digital Video Disc.
ROM: Read-Only Memory.
RAM: Random Access Memory.
ASIC: Application-Specific Integrated Circuit.
PLD: Programmable Logic Device.
LAN: Local Area Network.
GSM: Global System for Mobile communications.
LTE: Long-Term Evolution.
CANBus: Controller Area Network Bus.
USB: Universal Serial Bus.
PCI: Peripheral Component Interconnect.
FPGA: Field Programmable Gate Areas.
SSD: solid-state drive.
IC: Integrated Circuit.
CU: Coding Unit.
R-D: Rate-Distortion.
HDR: High dynamic range.
SDR: Standard dynamic range.
JVET: Joint Video Exploration Team.
AMVR: Adaptive Motion Vector Resolution.
POC: Picture Order Count.
SbTMVP: Subblock-based Temporal Motion Vector Predictor.
DV: displacement vector.

While this disclosure has described several example aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving prediction information of a current coding block in a current picture from a coded video bitstream, the prediction information indicating that the current coding block is coded using a subblock-based temporal motion vector prediction (SbTMVP) mode;
obtaining multiple displacement vector (DV) offsets from the coded video bitstream, each DV offset corresponding to a displacement vector candidate;
deriving multiple DV candidates by applying the multiple DV offsets to a fixed DV predictor of the current coding block;
comparing a template of the current coding block with each of multiple templates, each template of the multiple templates being located at a position specified by a corresponding one of the multiple DV candidates;
calculating a cost value associated with each one of the multiple DV candidates based on the comparing;
reordering DV offset indices of the multiple DV candidates based on their calculated cost values; and
predicting the current coding block in the SbTMVP mode based at least on a DV offset index selected from the reordered DV offset indices.

2. The method of claim 1, further comprising receiving an index signaled in the coded video bitstream, wherein the index indicates which DV offset candidate is selected among the reordered DV offset indices for performing SbTMVP.

3. The method of claim 1, wherein after the reordering, the method further comprises selecting a DV offset candidate with a lowest calculated template matching cost by default for performing SbTMVP.

4. The method of claim 1, wherein the cost value is calculated by performing Sum of Absolute Differences (SAD), Sum of Absolute Transformed Differences (SATD), Sum of Squared Error (SSE), sub-sampled SAD, or mean-removed SAD.

5. The method of claim 1, wherein the multiple DV candidates comprise Merge with Motion Vector Difference (MMVD) candidates.

6. The method of claim 5, wherein the comparing, the calculating, and the reordering are performed only for a subset of the MMVD candidates, wherein a relative order of one or more other ones of the MMVD candidates is kept unchanged.

7. The method of claim 5, wherein the comparing, the calculating, and the reordering are performed for all of the MMVD candidates, wherein after reordering only a number N of the MMVD candidates which have a lowest cost are used, wherein the number N is less than or equal to a total number of the MMVD candidates.

8. The method of claim 7, wherein an index in a range of [0, N−1] is signaled into a bitstream to indicate which MMVD candidate is used, wherein the number N is predefined or is signaled into a high-level syntax.

9. The method of claim 1, wherein the DV offset indices are reordered by descending or ascending order of cost values calculated for corresponding DV offset candidates.

10. A method of video decoding, comprising:
receiving prediction information of a current coding block in a current picture from a coded video bitstream, the prediction information indicating that the current coding block is coded using a subblock-based temporal motion vector prediction (SbTMVP) mode;
comparing a template of the current coding block with each of multiple templates, each template of the multiple templates being located at a position specified by a corresponding one of multiple displacement vector (DV) predictor candidates;
calculating a cost value associated with each one of the multiple DV predictor candidates based on the comparing;
reordering a list of the multiple DV predictor candidates based on their calculated cost values; and
predicting the current coding block in the SbTMVP mode based at least on a DV predictor selected from the reordered list of DV predictor candidates.

11. The method of claim 10, further comprising receiving an index signaled in the coded video bitstream, wherein the index indicates which DV predictor candidate is selected from the reordered list of the multiple DV predictor candidates for performing SbTMVP.

12. The method of claim 10, wherein after the reordering, the method further comprises selecting a DV predictor candidate with a lowest calculated template matching cost by default for performing SbTMVP.

13. The method of claim 10, wherein the list of the multiple DV predictor candidates is constructed from spatial neighboring coding units (CUs) or from history-based motion vector prediction (HMVP) candidates.

14. The method of claim 10, wherein after the reordering, only a first N number of the multiple DV predictor candidates on the list are signaled.

15. The method of claim 10, wherein the multiple DV predictor candidates in the list are reordered by descending or ascending order of their calculated cost values.

16. A method of video decoding, comprising:
receiving prediction information of a current coding block in a current picture from a coded video bitstream, the prediction information indicating that the current coding block is coded using a subblock-based temporal motion vector prediction (SbTMVP) mode;
generating a SbTMVP candidate list including multiple displacement vector (DV) candidates for the current coding block, wherein the SbTMVP candidate list includes at least one DV predictor candidate derived without applying any DV offset and at least one other DV predictor candidate derived by applying a DV offset to a base DV predictor;
comparing a template of the current coding block with each of multiple templates, each template of the multiple templates being located at a position specified by a corresponding one of the multiple DV candidates in the SbTMVP candidate list;
calculating a cost value associated with each one of the multiple DV candidates based on the comparing;
reordering the multiple DV candidates in the SbTMVP candidate list based on their calculated cost values; and
predicting the current coding block in the SbTMVP mode based on a DV predictor candidate selected from the reordered DV candidates in the SbTMVP candidate list.

17. The method of claim 16, further comprising receiving an index signaled in the coded video bitstream, wherein the index indicates which DV candidate is selected from the reordered SbTMVP candidate list for performing SbTMVP.

18. The method of claim 17, wherein the selected DV candidate is a SbTMVP DV candidate derived without applying any DV offset or is a SbTMVP Merge with Motion Vector Difference (MMVD) candidate derived by applying a respective DV offset to a respective base DV predictor.

19. The method of claim 18, wherein, when the selected DV candidate is the SbTMVP MMVD candidate, a signaling of the respective base DV predictor and a signaling of an index of the respective DV offset are performed separately.

20. The method of claim 16, wherein the SbTMVP candidate list is constructed independently of an affine merge candidate list when template matching based reordering of candidates is enabled for a current frame, wherein when a subblock merge mode is signaled, an additional syntax is signaled at coding block level to indicate whether to construct the SbTMVP candidate list or the affine merge candidate list.

* * * * *